US012711954B2

(12) United States Patent
Yang et al.

(10) Patent No.: US 12,711,954 B2
(45) Date of Patent: Aug. 18, 2026

(54) AUDIO PROCESSING METHOD AND RELATED APPARATUS

(71) Applicant: Tencent Technology (Shenzhen) Company Limited, Shenzhen (CN)

(72) Inventors: Zhanheng Yang, Shenzhen (CN); Sining Sun, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 143 days.

(21) Appl. No.: 18/800,629

(22) Filed: Aug. 12, 2024

(65) Prior Publication Data

US 2024/0404516 A1 Dec. 5, 2024

Related U.S. Application Data

(63) Continuation of application No. PCT/CN2023/131671, filed on Nov. 15, 2023.

(30) Foreign Application Priority Data

Dec. 26, 2022 (CN) ......................... 202211674936.3

(51) Int. Cl.
*G10L 15/04* (2013.01)
*G10L 15/02* (2006.01)
(Continued)

(52) U.S. Cl.
CPC ............ *G10L 15/187* (2013.01); *G10L 15/02* (2013.01); *G10L 15/30* (2013.01); *G10L 2015/025* (2013.01)

(58) Field of Classification Search
CPC ....... G10L 15/16; G10L 15/187; G10L 15/02; G10L 15/26; G10L 15/30; G10L 2015/025; G10L 19/005
(Continued)

(56) References Cited

U.S. PATENT DOCUMENTS

2022/0108689 A1 4/2022 Tripathi et al.
2022/0310073 A1 9/2022 Audhkhasi et al.

FOREIGN PATENT DOCUMENTS

CN 113724689 A 11/2021
CN 114203161 A 3/2022
(Continued)

OTHER PUBLICATIONS

International Search Report for PCT/CN2023/131671 dated Jan. 24, 2024 (PCT/ISA/210).

(Continued)

*Primary Examiner* — Md S Elahee
(74) *Attorney, Agent, or Firm* — Sughrue Mion, PLLC

(57) ABSTRACT

An audio processing method includes: acquiring an audio signal including audio frames; inputting the audio frames into a streaming acoustic network to obtain phoneme features representing phoneme information of the audio signal and streaming audio features; acquiring an entity set including first entities, wherein the first entities correspond to pieces of phoneme information; extracting second entities from the entity set based on the phoneme features, wherein the second entities correspond to the phoneme features, and wherein a second number of the second entities is greater than or equal to a third number of the audio frames and less than or equal to a first number of the first entities; obtaining a text recognition result based on inputting the audio signal, the streaming audio features, and the second entities into a non-streaming acoustic network; and outputting the text recognition result.

20 Claims, 14 Drawing Sheets

(51) Int. Cl.
*G10L 15/187* (2013.01)
*G10L 15/30* (2013.01)

(58) Field of Classification Search
USPC .......................................................... 704/254
See application file for complete search history.

(56) References Cited

FOREIGN PATENT DOCUMENTS

| | | | |
|---|---|---|---|
| CN | 114242064 A * | 3/2022 | ............. G10L 15/22 |
| CN | 116959418 A | 10/2023 | |

OTHER PUBLICATIONS

Written Opinion for PCT/CN2023/131671 dated Jan. 24, 2024 (PCT/ISA/237).

* cited by examiner

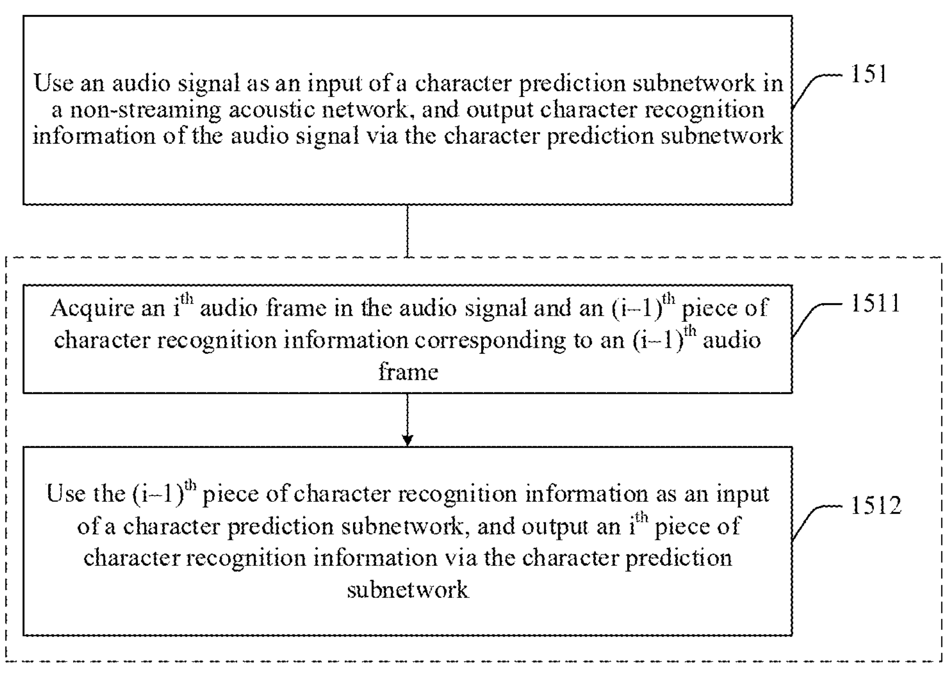

FIG. 16

Use an audio signal as an input of a character prediction subnetwork in a non-streaming acoustic network, and output character recognition information of the audio signal via the character prediction subnetwork — 151

Acquire a first audio frame in the audio signal and preset character recognition information — 1513

Use the first audio frame and the preset character recognition information as inputs of the character prediction subnetwork, and output character recognition information corresponding to the first audio frame via the character prediction subnetwork — 1514

Audio signal acquiring module 210

Streaming acoustic network processing module 220

Entity set acquiring module 230

Entity extraction module 240

Non-streaming acoustic network processing module 250

Audio processing apparatus

AUDIO PROCESSING METHOD AND RELATED APPARATUS

CROSS-REFERENCE TO RELATED APPLICATIONS

This application is a continuation application of International Application No. PCT/CN2023/131671 filed on Nov. 15, 2023, which claims priority to Chinese Patent Application No. 202211674936.3, filed with the China National Intellectual Property Administration on Dec. 26, 2022, the disclosures of each being incorporated by reference herein in their entireties.

FIELD

The disclosure relates to the field of artificial intelligence technologies, and in particular, to audio processing.

BACKGROUND

In recent years, with diverse development of deep learning, an automatic speech recognition (ASR) technology becomes widely popular for the architecture and performance of the automatic speech recognition technology. In application, training data configured for training an automatic speech recognition model may lack proper nouns or infrequent combinations (such as names of people and places), which may degrade performance of an automatic speech recognition system.

An external language model-based fusion solution may be employed. A language model trained using a training set including entity information such as the proper nouns is fused with an output of the automatic speech recognition model. During training, the language model and the automatic speech recognition model are trained separately, and a separately trained language model and separately trained automatic speech recognition model are cascaded. During training of the automatic speech recognition model, a cascaded final result may not be optimized, and a global optimum in a reasoning process may not be achieved. In addition, because there may be a mismatch between the separately trained external language model and automatic speech recognition model, during testing, when an audio signal is recognized through the cascaded language model and automatic speech recognition model, recognition accuracy of the proper nouns or the infrequent combinations may be low.

SUMMARY

Provided are an audio processing method, apparatus, and a non-transitory computer readable medium.

According to some embodiments, an audio processing method, performed by a computer device, includes: acquiring an audio signal including one or more audio frames; inputting the one or more audio frames into a streaming acoustic network to obtain one or more phoneme features representing phoneme information of the audio signal and one or more streaming audio features; acquiring an entity set including one or more first entities, wherein the one or more first entities correspond to one or more pieces of phoneme information; extracting one or more second entities from the entity set based on the one or more phoneme features, wherein the one or more second entities correspond to the one or more phoneme features, and wherein a second number of the one or more second entities is greater than or equal to a third number of the one or more audio frames and less than or equal to a first number of the one or more first entities; obtaining a text recognition result based on inputting the audio signal, the one or more streaming audio features, and the one or more second entities into a non-streaming acoustic network; and outputting the text recognition result.

According to some embodiments, an audio processing apparatus, includes: at least one memory configured to store computer program code; and at least one processor configured to read the program code and operate as instructed by the program code, the program code including: audio signal acquiring code configured to configured to cause at least one of the at least one processor to acquire an audio signal including one or more audio frames; streaming acoustic network processing code configured to configured to cause at least one of the at least one processor to input the one or more audio frames into a streaming acoustic network to obtain one or more phoneme features representing phoneme information of the audio signal and one or more streaming audio features; entity set acquiring code configured to configured to cause at least one of the at least one processor to acquire an entity set including one or more first entities, wherein the one or more first entities correspond to one or more pieces of phoneme information; entity extraction code configured to configured to cause at least one of the at least one processor to extract one or more second entities from the entity set based on the one or more phoneme features, wherein the one or more second entities correspond to the one or more phoneme features, and wherein a second number of the one or more second entities is greater than or equal to a third number of the one or more audio frames and less than or equal to a first number of the one or more first entities; non-streaming acoustic network processing code configured to configured to cause at least one of the at least one processor to obtain a text recognition result based on inputting the audio signal, the one or more streaming audio features, and the one or more second entities into a non-streaming acoustic network; and first outputting code configured to cause at least one of the at least one processor to output the text recognition result.

According to some embodiments, a non-transitory computer-readable storage medium, storing computer code which, when executed by at least one processor, causes the at least one processor to at least: acquire an audio signal including one or more audio frames; input the one or more audio frames into a streaming acoustic network to obtain one or more phoneme features representing phoneme information of the audio signal and one or more streaming audio features; acquire an entity set including one or more first entities, wherein the one or more first entities correspond to one or more pieces of phoneme information; extract one or more second entities from the entity set based on the one or more phoneme features, wherein the one or more second entities correspond to the one or more phoneme features, and wherein a second number of the one or more second entities is greater than or equal to a third number of the one or more audio frames and less than or equal to a first number of the one or more first entities; obtain a text recognition result based on inputting the audio signal, the one or more streaming audio features, and the one or more second entities into a non-streaming acoustic network; and output the text recognition result.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 16 is a flowchart of an audio processing method according to some embodiments.

FIG. 17 is a flowchart of an audio processing method according to some embodiments.

DESCRIPTION OF EMBODIMENTS

Figure 1:
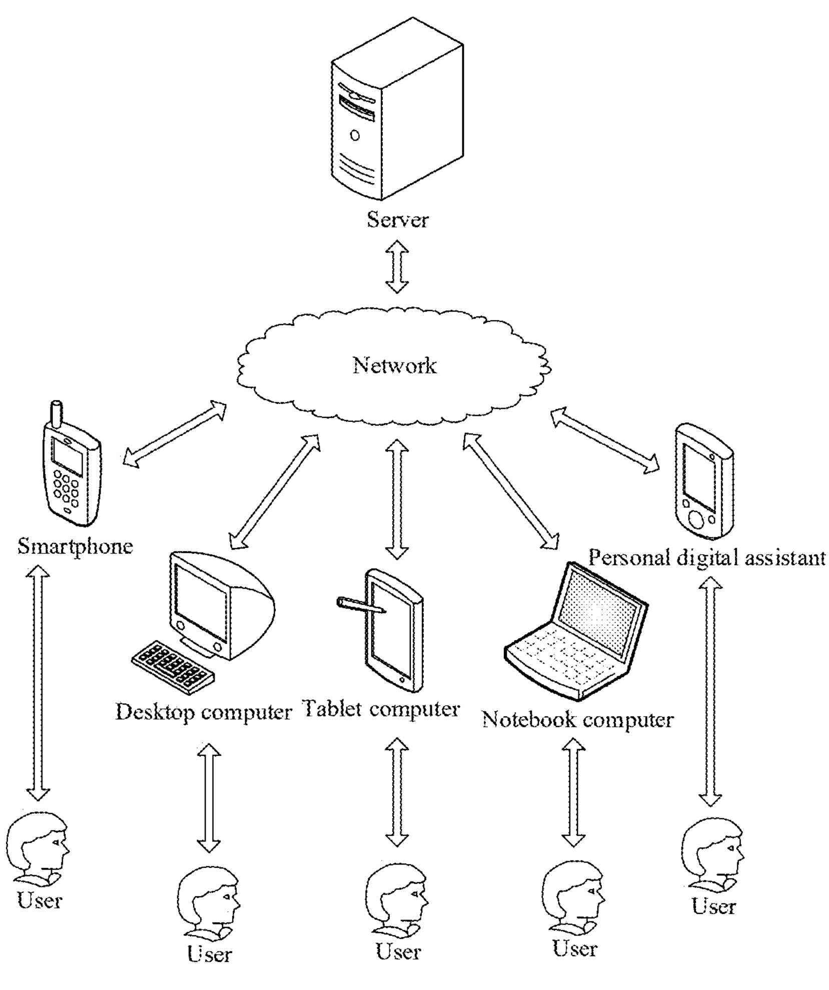
FIG. 1 is a schematic diagram of an architecture of an audio processing system according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

Some embodiments provide an audio processing method. A streaming acoustic network is established to predict N phoneme features and N streaming audio features corresponding to N audio frames in an audio signal; L entities that have correspondences with the N phoneme features are extracted from an entity set based on the obtained N phoneme features; and a text recognition result of the audio signal is predicted by a non-streaming acoustic network based on the N audio frames, the N streaming audio features, and the L entities, thereby improving accuracy of text recognition.

In the descriptions, claims, and accompanying drawings, the terms "first", "second", "third", "fourth", and the like are intended to distinguish between similar objects but do not necessarily indicate a specific order or sequence. Such used data is interchangeable where appropriate, and some embodiments may be implemented in an order other than those illustrated or described here. In addition, the terms "include", "corresponding to" and any other variants are intended to cover the non-exclusive inclusion. For example, a process, method, system, product, or device that includes a series of operations or units is not necessarily limited to those expressly listed operations or units, but may include other operations or units not expressly listed or inherent to such a process, method, product, or device.

In recent years, with diverse development of deep learning, an end-to-end (E2E) automatic speech recognition (ASR) technology may be used for the architecture and performance of the technology. However, an end-to-end feature leads to recognition performance of the technology being highly correlated with training data distribution. In application, due to lack of proper nouns or infrequent combinations (such as names of people and places) in the training data, it may be difficult for an ASR system to identify these proprietary entities, and the proprietary entities may be points that would otherwise be extracted in a sentence, consequently causing a decrease in system recognition performance.

Artificial intelligence (AI) is a theory, a method, a technology, and an application system that use a digital computer or a machine controlled by the digital computer to simulate, extend, and expand human intelligence, perceive an environment, obtain knowledge, and use knowledge to obtain a result. Artificial intelligence is a technology in computer science that attempts to understand the essence of intelligence and produce a new intelligent machine that can react in a manner similar to human intelligence. The artificial intelligence is to study the design principles and implementation methods of various intelligent machines, to enable the machines to have the functions of perception, reasoning, and decision-making.

The artificial intelligence technology is a comprehensive discipline, and relates to a wide range of fields including both hardware-level technologies and software-level technologies. The artificial intelligence technologies may include technologies such as a sensor, a dedicated artificial intelligence chip, cloud computing, distributed storage, a big data processing technology, an operating/interaction system, and electromechanical integration. The artificial intelligence software technologies may include computer vision technology, a speech processing technology, a natural language processing technology, and machine learning/deep learning.

A key technology of a speech technology includes an automatic speech recognition (ASR) technology text to speech (TTS) technology, and a voiceprint recognition technology. It is a development direction of human-computer interaction in the future that a computer can listen, see, speak, and feel. A voice may be used more frequently for human-computer interaction in the future.

Natural language processing (NLP) may be included in the field of computer science and artificial intelligence. The natural language processing is to study various theories and methods that enable communication between humans and computers using natural language. The natural language processing is a science that integrates linguistics, computer science, and mathematics. Therefore, study in this field involves natural language, for example, a language that people use, and natural language processing is related to the study of linguistics. A natural language processing technology may include technologies such as text processing, semantic understanding, machine translation, robot question answering, and knowledge graph.

Machine learning (ML) is a multi-field interdiscipline, and relates to a plurality of disciplines such as the probability theory, statistics, the approximation theory, convex analysis, and the algorithm complexity theory. Machine learning involves studying how a computer simulates or implements a human learning behavior to obtain new knowledge or skills, and reorganize an existing knowledge structure, to keep improving its performance. Machine learning may be used in artificial intelligence, is a way to make the computer intelligent, and may be applied to various fields of artificial intelligence. Machine learning and deep learning may include technologies such as an artificial neural network, a belief network, reinforcement learning, transfer learning, inductive learning, and learning from demonstrations.

For case of understanding of the technical solutions provided in some embodiments, some key terms used in some embodiments are first explained.

Automatic speech recognition (ASR): a technology that converts human speech into a text.

A weighted finite-state transducer (WFST) is expanded from a finite-state acceptor (FSA) and may be referred to as a "decoder" in the ASR field. Four networks that are an acoustic model, a context-dependency transducer which is an FST for context-dependency processing, a pronunciation dictionary, and a language model are included to form a decoding network.

Real time factor (RTF): also referred to as a system real-time factor, and it is a value that may be configured for measuring decoding speed of an automatic speech recognition system.

Chunk: a speech block, and divide input streaming speech into blocks with a length for processing in a streaming process.

Transducer: a transducer.

Encoder: an encoder.

Predictor: a prediction network, and a component in the transducer.

A streaming acoustic network, also referred to as a streaming acoustic model, is configured to recognize local context. In the end-to-end automatic speech recognition technology, the streaming acoustic network returns a recognition result while a user is speaking, and many intermediate results are generated before a sentence ends.

A non-streaming acoustic network, also referred to as a non-streaming acoustic model, is configured to recognize global context. In the end-to-end automatic speech recognition technology, a recognition result is returned after the user finishes speaking.

An external language model-based fusion solution may be employed. A language model trained using a training set including entity information such as proper nouns is fused with an output posterior matrix of an end-to-end ASR model by using a weighted finite state machine or another manner.

The external language model-based fusion solution may be used in engineering. Because an external language model is trained separately and cascaded with the end-to-end ASR model, during training, the ASR model may not optimize a cascaded final result, and a global optimum in a reasoning process may not be achieved. There may be a mismatch between the external language model trained separately and the ASR model, and during the fusion, manual adjustment of hyperparameters may be used. The external language model is equivalent to a downstream module and cannot make up for information loss caused by the upstream module ASR. The ASR model training itself does not introduce entity information, and entity recognition may be poor after the fusion. During testing, when an audio signal is recognized through the cascaded language model and automatic speech recognition model, recognition accuracy of the proper nouns or the infrequent combinations may be low.

According to the audio processing method provided in some embodiments, a streaming acoustic network is established to predict N phoneme features and N streaming audio features corresponding to N audio frames in an audio signal; L entities that have correspondences with the N phoneme features are extracted from an entity set based on the obtained N phoneme features; and a text recognition result of the audio signal is predicted by a non-streaming acoustic network based on the N audio frames, the N streaming audio features, and the L entities, thereby improving accuracy of text recognition.

For case of understanding, FIG. 1 is a schematic diagram of an application environment of an audio processing method according to some embodiments. As shown in FIG. 1, the audio processing method in some embodiments may be applied to an audio processing system. The audio processing system includes a server and a terminal device. The server may be an independent physical server, or may be a server cluster or a distributed system including a plurality of physical servers, or may be a cloud server that provides cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be connected directly or indirectly via a wired or a wireless communication method.

The server acquires an audio signal, the audio signal including N audio frames; the server inputs N audio frames into a streaming acoustic network to obtain N phoneme features and N streaming audio features, the N phoneme features being configured for representing phoneme information of the audio signal; the server acquires an entity set, the entity set including K pre-constructed entities, and the K entities corresponding to K pieces of phoneme information; the server extracts L entities from the entity set based on the N phoneme features, the L entities corresponding to the N phoneme features; and the server inputs the N audio frames, the N streaming audio features, and the L entities into a non-streaming acoustic network to obtain a text recognition result.

Figure 2:
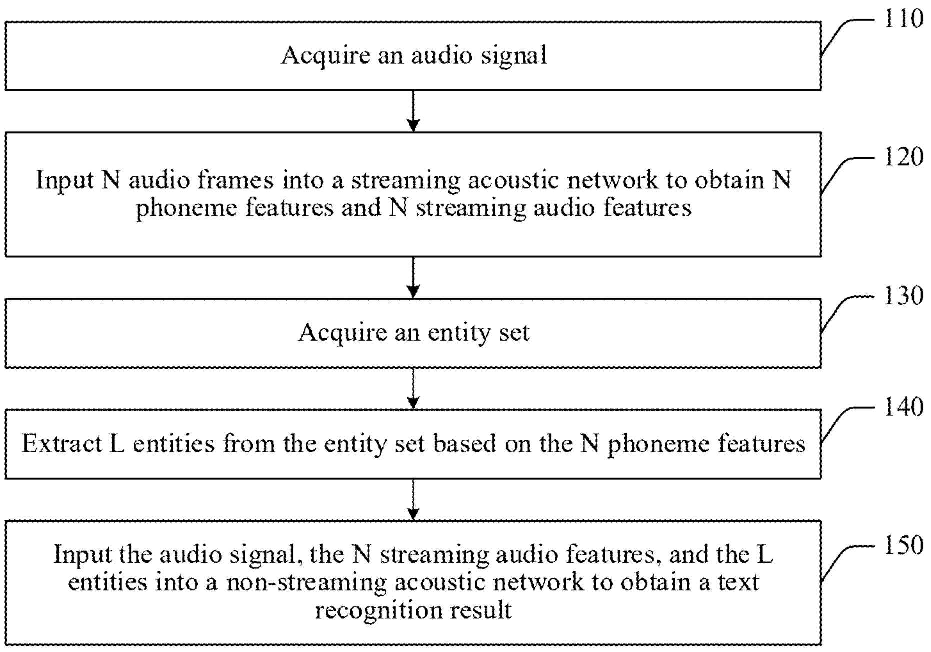
FIG. 2 is a flowchart of an audio processing method according to some embodiments.

The following introduces the audio processing method in some embodiments from a perspective of the server. Reference may also be made to FIG. 2. The audio processing method provided in some embodiments may include operation 110 to operation 150. For example:

110: Acquire an audio signal.

The audio signal includes N audio frames, and N is an integer greater than or equal to 1.

After the audio signal is acquired, framing and blocking are performed on the audio signal to obtain the N audio frames. In an end-to-end automatic speech recognition scenario, the audio signal is acquired in real time and may be a voice audio of a user. Each audio frame corresponds to each audio unit in the voice audio. For example, a voice audio in Chinese is "给李华和王伟发送信息", where audio units are Chinese characters "给", "李", "华", "和", "王", "伟", "发", "送", "信", and "息" in the voice audio. For another example, a voice audio in English is “Send messages to Li Hua and Wang Wei”, where audio units are English words “Send”, “messages”, “to”, “Li”, “Hua”, “and”, “Wang”, and “Wei” in the voice audio.

120: Input the N audio frames into a streaming acoustic network to obtain N phoneme features and N streaming audio features.

The N phoneme features are configured for representing phoneme information of the audio signal.

The streaming acoustic network includes a phoneme prediction subnetwork, a causal encoding subnetwork, and a phoneme joint subnetwork. The phoneme prediction subnetwork is a neural network, the causal encoding subnetwork is configured to perform audio feature encoding, and the phoneme joint subnetwork is configured to perform feature fusion on an output of the phoneme prediction subnetwork and an output of the causal encoding subnetwork. The N audio frames are inputted into the streaming acoustic network, the N streaming audio features are output via the causal encoding subnetwork, and the N phoneme features are output via the phoneme joint subnetwork. There are correspondences between the N audio frames and the N phoneme features, and there are correspondences between the N audio frames and the N streaming audio features.

A phoneme is a minimum phonetic unit obtained through division based on a natural attribute of a speech. In terms of an acoustic property, the phoneme is a minimum phonetic unit obtained through division from a perspective of sound quality. In terms of a physiologic property, one pronunciation action forms one phoneme. For example, [ma] includes two pronunciation actions [m] and [a], which are two phonemes. The N audio frames correspond to N pieces of phoneme information, and the N pieces of phoneme information corresponding to the N audio frames are combined into phoneme information of the audio signal. One piece of phoneme information may include at least one phoneme.

130: Acquire an entity set.

The entity set includes K entities, the K entities correspond to K pieces of phoneme information, and K is an integer greater than 1. The entities included in the entity set may be proper nouns or infrequent combinations, and the entity set may facilitate the recognition of the proper nouns or the infrequent combinations in the audio signal. The entities in the entity set may be pre-constructed based on the audio signal, and includes the proper nouns or the infrequent combinations of the field related to the audio signal.

The K entities are pre-constructed to form the entity set, and each entity corresponds to one piece of phoneme information.

140: Extract L entities from the entity set based on the N phoneme features.

The L entities correspond to the N phoneme features, and L is an integer greater than or equal to N and less than or equal to K.

The L entities of which phoneme information is the same as the N phoneme features are extracted from the entity set via an entity extraction network. L pieces of phoneme information corresponding to the L entities are the same as the N phoneme features. For example, four pieces of phoneme information represented by four phoneme features are “wang”, “fang”, “li”, and “hua”, and an entity set includes entities, such as 王芳, 王方, 汪芳, 李华, 梨花, 丽华, 方往, 芳华, 王丽, 王华, 张三, and 赵四. Six entities (王芳, 王方, 汪芳, 李华, 梨花, and 丽华) are extracted from the entity set based on the four pieces of phoneme information (“wang”, “fang”, “li”, and “hua”).

150: Input the audio signal, the N streaming audio features, and the L entities into a non-streaming acoustic network to obtain a text recognition result.

The non-streaming acoustic network includes a character prediction subnetwork, a context information extraction subnetwork, a non-causal encoding subnetwork, and an attention bias character joint subnetwork. The character prediction subnetwork is a neural network, the non-causal encoding subnetwork is configured to perform audio feature encoding, and the context information extraction subnetwork is configured to receive the L entities and generate L context vectors with a fixed dimension. The N audio frames, the N streaming audio features, and the L entities are inputted into the non-streaming acoustic network. Character recognition information is output via the character prediction subnetwork, context information features are output via the context information extraction subnetwork, a non-streaming audio feature is output via the non-causal encoding subnetwork, and the text recognition result of the audio signal is output via the attention bias character joint subnetwork.

Figure 3:
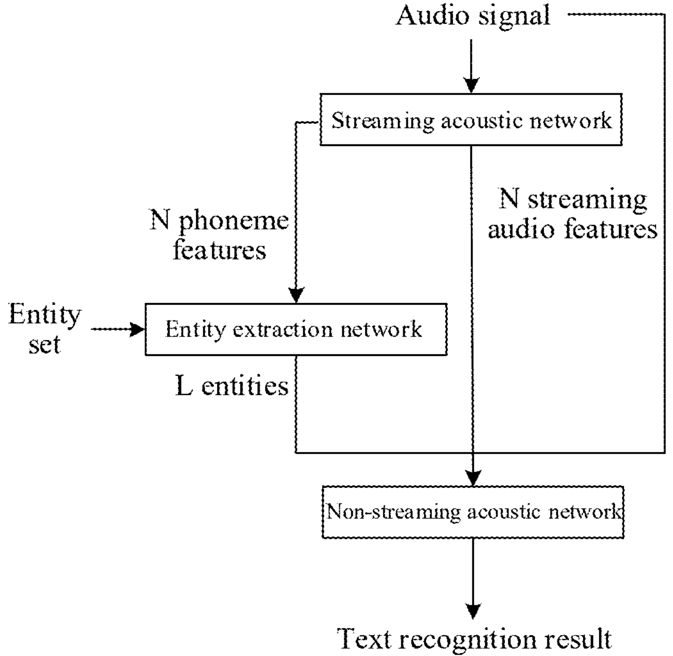
FIG. 3 is a schematic diagram of an audio processing process according to some embodiments.

For case of understanding, FIG. 3 is a schematic diagram of an audio processing process according to some embodiments. An audio signal is acquired, N audio frames of the audio signal are inputted into a streaming acoustic network, and N phoneme features and N streaming audio features are output via the streaming acoustic network. An entity set is acquired, and L entities is extracted from the entity set based on the N phoneme features. The audio signal, the N streaming audio features, and the L entities are inputted into a non-streaming acoustic network, and a text recognition result is output via the non-streaming acoustic network.

According to the audio processing method provided in some embodiments, a streaming acoustic network is established to predict N phoneme features and N streaming audio features corresponding to N audio frames in an audio signal; L entities that have correspondences with the N phoneme features are extracted from an entity set based on the obtained N phoneme features; and a text recognition result of the audio signal is predicted by a non-streaming acoustic network based on the N audio frames, the N streaming audio features, and the L entities, thereby improving accuracy of text recognition.

Figure 4:
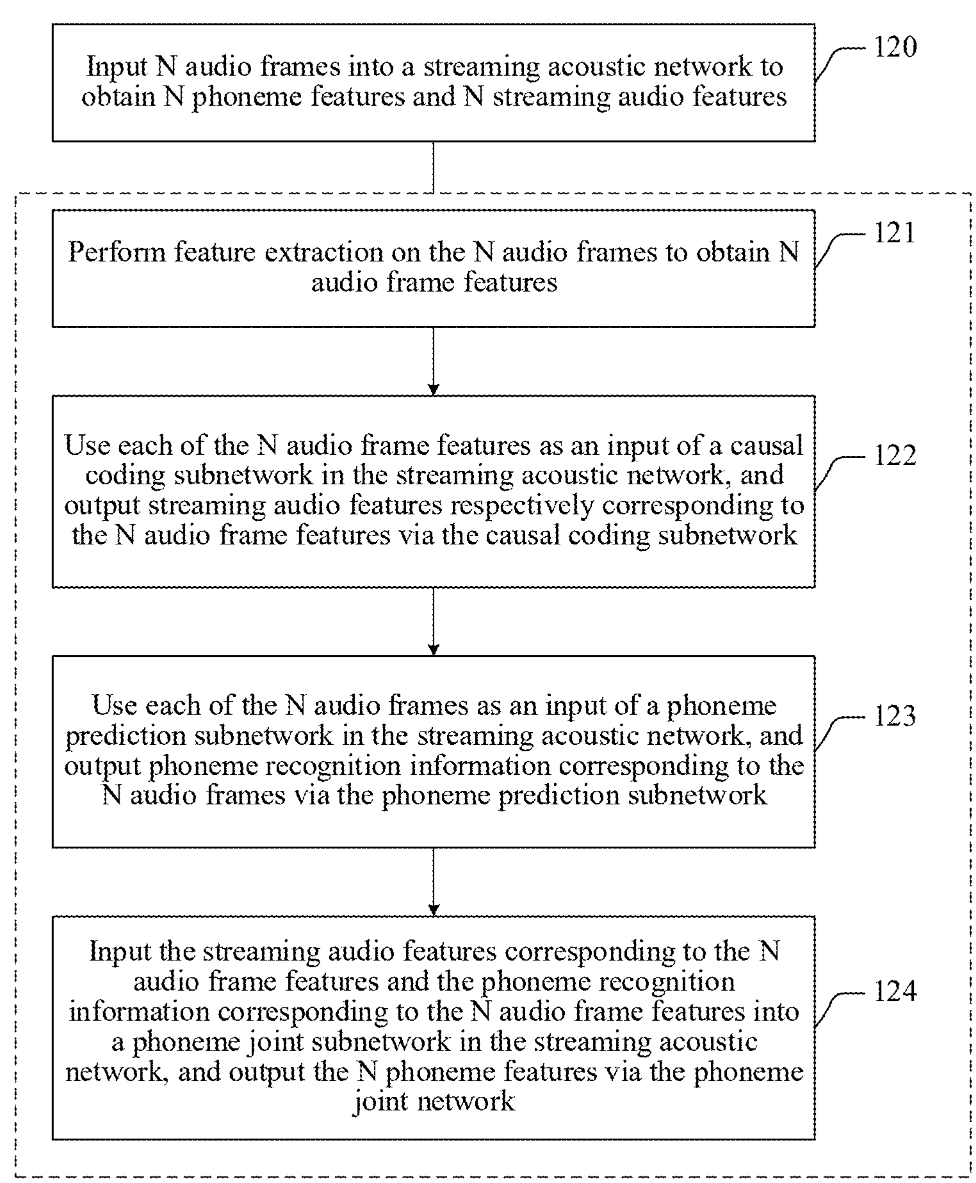
FIG. 4 is a flowchart of an audio processing method according to some embodiments.

In the audio processing method provided in some embodiments as illustrated in FIG. 2, the streaming acoustic network may include a phoneme prediction subnetwork, a causal encoding subnetwork, and a phoneme joint subnetwork. Refer to FIG. 4. Operation 120 includes sub-operation 121 to sub-operation 124. There is no sequence of performing sub-operation 122 and sub-operation 123. Sub-operation 122 and sub-operation 123 may be performed in parallel, sub-operation 122 may be performed first and sub-operation 123 may be performed, or sub-operation 123 may be performed first and sub-operation 122 may be performed. Some embodiments use an example in which sub-operation 122 is performed first and sub-operation 123 may be performed for description. For example:

121: Perform feature extraction on the N audio frames to obtain N audio frame features.

The feature extraction is performed on each of the N audio frames to obtain audio frame features corresponding to the audio frames. The N audio frames correspond to the N audio frame features. The audio frame features are represented in a matrix format.

122: Use each of the N audio frame features as an input of the causal encoding subnetwork in the streaming acoustic network, and output streaming audio features respectively corresponding to the N audio frame features via the causal encoding subnetwork.

The N audio frame features are inputted into the causal encoding subnetwork, and the streaming audio features respectively corresponding to the N audio frame features are output via the causal encoding subnetwork. Each audio frame feature corresponds to one streaming audio feature, and the N audio frame features correspond to N streaming audio features. The inputted audio frame features produce, via the causal encoding subnetwork, streaming audio features represented by a streaming high-dimensional feature. The streaming audio features are represented in a matrix format. The audio frame features in the matrix format are encoded by the causal encoder to obtain the streaming audio features in the matrix format.

123: Use each of the N audio frames as an input of the phoneme prediction subnetwork in the streaming acoustic network, and output phoneme recognition information corresponding to the N audio frames via the phoneme prediction subnetwork.

The N audio frames are inputted into the phoneme prediction subnetwork, and the phoneme recognition information corresponding to the N audio frames is output via the phoneme prediction subnetwork. Each audio frame corresponds to one piece of phoneme recognition information, and the N audio frames correspond to N pieces of phoneme recognition information. The phoneme recognition information of each audio frame is predicted by the phoneme prediction subnetwork. The phoneme recognition information is represented in a matrix format. Phoneme recognition information corresponding to an $i^{th}$ audio frame is predicted based on an $(i-1)^{th}$ piece of phoneme recognition information corresponding to an $(i-1)^{th}$ audio frame and the $i^{th}$ audio frame of the N audio frames.

124: Input the streaming audio features corresponding to the N audio frame features and the phoneme recognition information corresponding to the N audio frame features into the phoneme joint subnetwork in the streaming acoustic network, and output N phoneme features via the phoneme joint subnetwork.

The streaming audio feature and phoneme recognition information corresponding to each of the N audio frame features are used as inputs of the phoneme joint subnetwork, and the phoneme features respectively corresponding to the audio frame features are output via the phoneme joint subnetwork. Each audio frame corresponds to one phoneme feature, and the N audio frames correspond to the N phoneme features. The streaming audio features and the phoneme recognition information are fused by the phoneme joint subnetwork to obtain the phoneme features. The phoneme features are represented in a matrix format. The streaming audio features in the matrix format and the phoneme recognition information in the matrix format are fused by the phoneme joint subnetwork to obtain the phoneme features in the matrix format.

Figure 5:
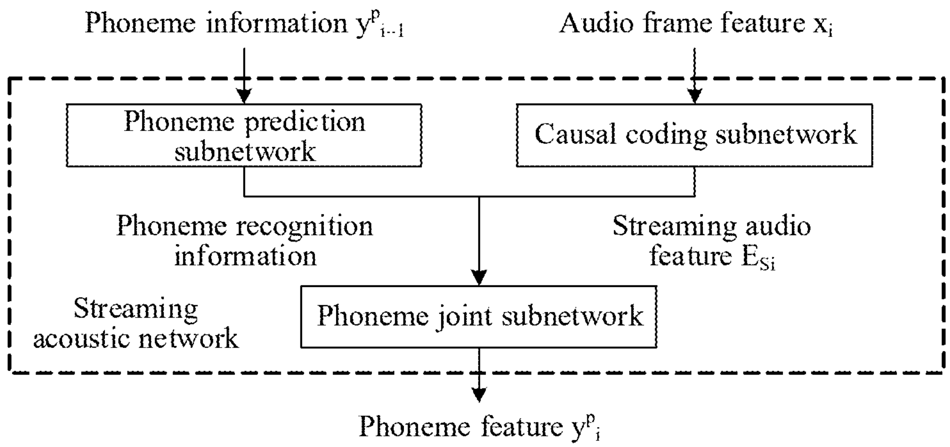
FIG. 5 is a schematic diagram of a streaming acoustic network according to some embodiments.

For ease of understanding, FIG. 5 is a schematic diagram of a streaming acoustic network according to some embodiments. Feature extraction is performed on an $i^{th}$ audio frame to obtain an audio frame feature x_i corresponding to the $i^{th}$ audio frame. The audio frame feature x_i corresponding to the $i^{th}$ audio frame is used as an input of the causal encoding subnetwork in the streaming acoustic network, and a streaming audio feature E_Si corresponding to the $i^{th}$ audio frame is output via the causal encoding subnetwork. An $(i-1)^{th}$ piece of phoneme recognition information y_(i-1)/\p corresponding to the $(i-1)^{th}$ audio frame and the $i^{th}$ audio frame are used as inputs of the phoneme prediction subnetwork in the streaming acoustic network, and phoneme recognition information corresponding to the $i^{th}$ audio frame is output via the phoneme prediction subnetwork. The streaming audio feature E_Si corresponding to the $i^{th}$ audio frame and the phoneme recognition information corresponding to the $i^{th}$ audio frame are inputted into the phoneme joint subnetwork in the streaming acoustic network, and a phoneme feature y_i^p corresponding to the $i^{th}$ audio frame is output via the phoneme joint subnetwork. The phoneme feature y_i^p represents phoneme information corresponding to the $i^{th}$ audio frame.

According to the audio processing method provided in some embodiments, a streaming acoustic network is established to predict phoneme recognition information corresponding to audio frames in an audio signal by a phoneme prediction subnetwork in the streaming acoustic network; streaming audio features are generated by encoding audio frame features by a causal encoding subnetwork in the streaming acoustic network; and phoneme features are generated by fusing the streaming audio features and the phoneme recognition information by a phoneme joint subnetwork in the streaming acoustic network, thereby improving accuracy of text recognition.

Figure 6:
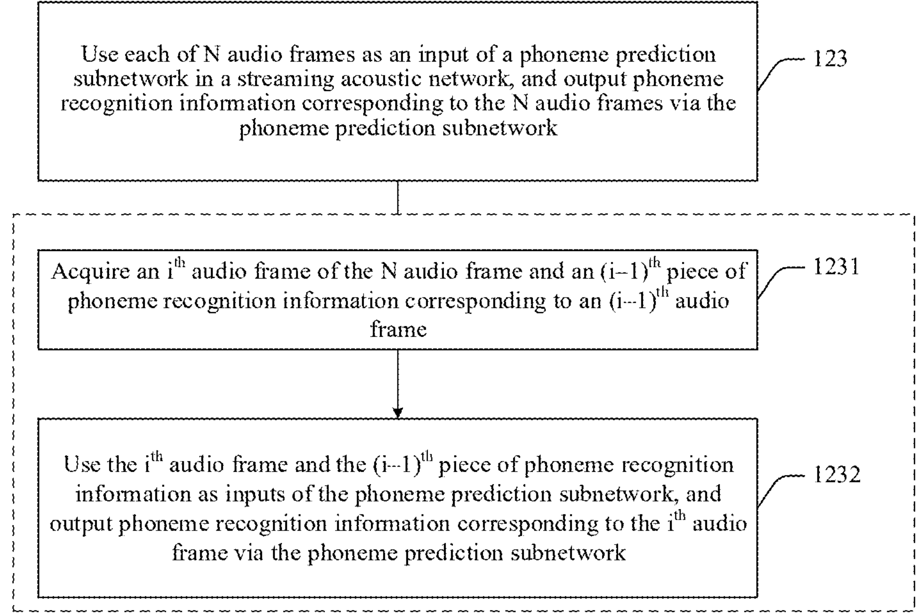
FIG. 6 is a flowchart of an audio processing method according to some embodiments.

In the audio processing method provided in some embodiments as illustrated in FIG. 2, for an $i^{th}$ audio frame of the N audio frames, reference may be made to FIG. 6. Sub-operation 123 may further include sub-operation 1231 and sub-operation 1232. For example:

1231: Acquire the $i^{th}$ audio frame of the N audio frame and an $(i-1)^{th}$ piece of phoneme recognition information corresponding to an $(i-1)^{th}$ audio frame.

The $(i-1)^{th}$ piece of phoneme recognition information is generated by the phoneme prediction subnetwork based on the $(i-1)^{th}$ audio frame, and i is an integer greater than 1.

1232: Use the $i^{th}$ audio frame and the $(i-1)^{th}$ piece of phoneme recognition information as inputs of the phoneme prediction subnetwork, and output phoneme recognition information corresponding to the $i^{th}$ audio frame via the phoneme prediction subnetwork.

The phoneme prediction subnetwork acquires the phoneme recognition information corresponding to the $i^{th}$ audio frame by predicting based on the $(i-1)^{th}$ piece of phoneme recognition information corresponding to the $(i-1)^{th}$ audio frame and the $i^{th}$ audio frame, the phoneme prediction subnetwork acquires the $(i-1)^{th}$ piece of phoneme recognition information corresponding to the $(i-1)^{th}$ audio frame by predicting based on an $(i-2)^{th}$ piece of phoneme recognition information corresponding to an $(i-2)^{th}$ audio frame and the $(i-1)^{th}$ audio frame, and so on. The phoneme prediction subnetwork is a neural network, and predicts phoneme recognition information of a current frame based on predicted phoneme recognition information of a previous frame.

According to the audio processing method provided in some embodiments, a phoneme prediction subnetwork predicts phoneme recognition information of a current frame based on the current frame and phoneme recognition information corresponding to a previous frame, and predicts N audio frames in sequence to obtain N pieces of phoneme recognition information corresponding to the N audio frames, to lay a foundation for improving accuracy of text recognition.

Figure 7:
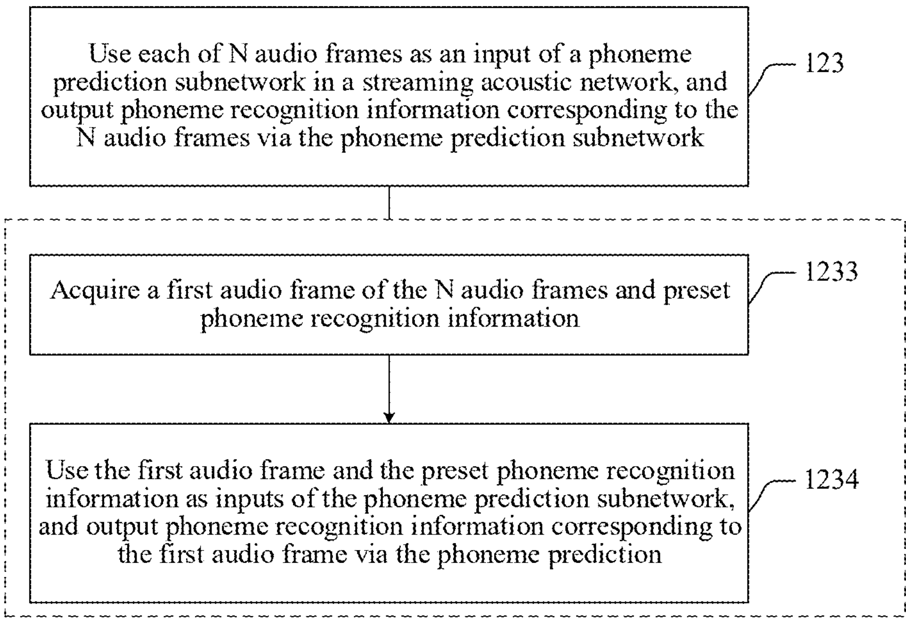
FIG. 7 is a flowchart of an audio processing method according to some embodiments.

In the audio processing method provided in some embodiments as illustrated in FIG. 2, for a first audio frame of the N audio frames, reference may be made to FIG. 7. Sub-operation 123 may further include sub-operation 1233 and sub-operation 1234. For example:

1233: Acquire the first audio frame of the N audio frames and preset phoneme recognition information.

1234: Use the first audio frame and the preset phoneme recognition information as inputs of the phoneme prediction subnetwork, and output phoneme recognition information corresponding to the first audio frame via the phoneme prediction subnetwork.

The phoneme prediction subnetwork acquires the phoneme recognition information corresponding to the $i^{th}$ audio frame by predicting based on the $(i-1)^{th}$ piece of phoneme recognition information corresponding to the $(i-1)^{th}$ audio frame and the $i^{th}$ audio frame, and the phoneme prediction subnetwork acquires the $(i-1)^{th}$ piece of phoneme recognition information corresponding to the $(i-1)^{th}$ audio frame by predicting based on an $(i-2)^{th}$ piece of phoneme recognition information corresponding to an $(i-2)^{th}$ audio frame and the $(i-1)^{th}$ audio frame. The phoneme recognition information corresponding to the first audio frame of the N audio frames is predicted by the phoneme prediction subnetwork based on the preset phoneme recognition information and the first audio frame.

According to the audio processing method provided in some embodiments, a phoneme prediction subnetwork predicts phoneme recognition information of a current frame based on the current frame and phoneme recognition information corresponding to a previous frame, and predicts N audio frames in sequence to obtain N pieces of phoneme recognition information corresponding to the N audio frames, to lay a foundation for improving accuracy of text recognition.

Figure 8:
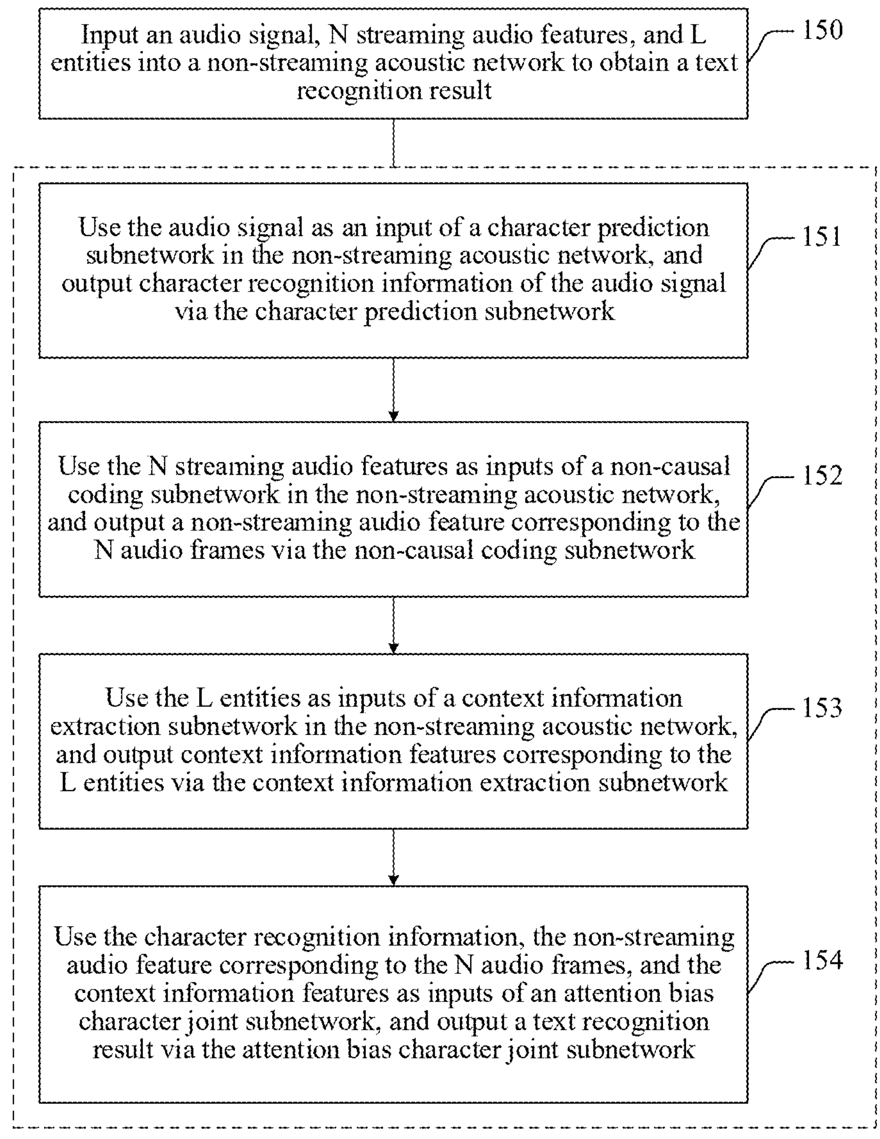
FIG. 8 is a flowchart of an audio processing method according to some embodiments.

In the audio processing method provided in some embodiments as illustrated in FIG. 2, the non-streaming acoustic network may include a character prediction subnetwork, a context information extraction subnetwork, a non-causal encoding subnetwork, and an attention bias character joint subnetwork. Reference may also be made to FIG. 8. Operation 150 further includes sub-operation 151 to sub-operation 154. There is no sequence of performing sub-operation 151, sub-operation 152, and sub-operation 153. Sub-operation 151, sub-operation 152, and sub-operation 153 may be performed in parallel, sub-operation 151 may be performed first, sub-operation 152 may be performed, and sub-operation 153 may be performed, or another performing manner. Some embodiments use an example in which sub-operation 151 is performed first, sub-operation 152 may be performed, and sub-operation 153 may be performed for description. For example:

151: Use the audio signal as an input of the character prediction subnetwork in the non-streaming acoustic network, and output character recognition information of the audio signal via the character prediction subnetwork.

The audio signal is inputted into the character prediction subnetwork, and the character recognition information of the audio signal is output via the character prediction subnetwork.

152: Use the N streaming audio features as inputs of the non-causal encoding subnetwork in the non-streaming acoustic network, and output a non-streaming audio feature corresponding to the N audio frames via the non-causal encoding subnetwork.

The N streaming audio features are inputted into the non-causal encoding subnetwork, and the non-streaming audio feature corresponding to the N audio frames is output via the non-causal encoding subnetwork. The N audio frames correspond to one non-streaming audio feature. The inputted streaming audio features produce, via the non-causal encoding subnetwork, a non-streaming audio feature represented by a non-streaming high-dimensional feature. The non-streaming audio feature is represented in the matrix format. The streaming audio features in the matrix format are encoded by the non-causal encoder to obtain the non-streaming audio feature in the matrix format.

153: Use the L entities as inputs of the context information extraction subnetwork in the non-streaming acoustic network, and output context information features corresponding to the L entities via the context information extraction subnetwork.

Figure 9:
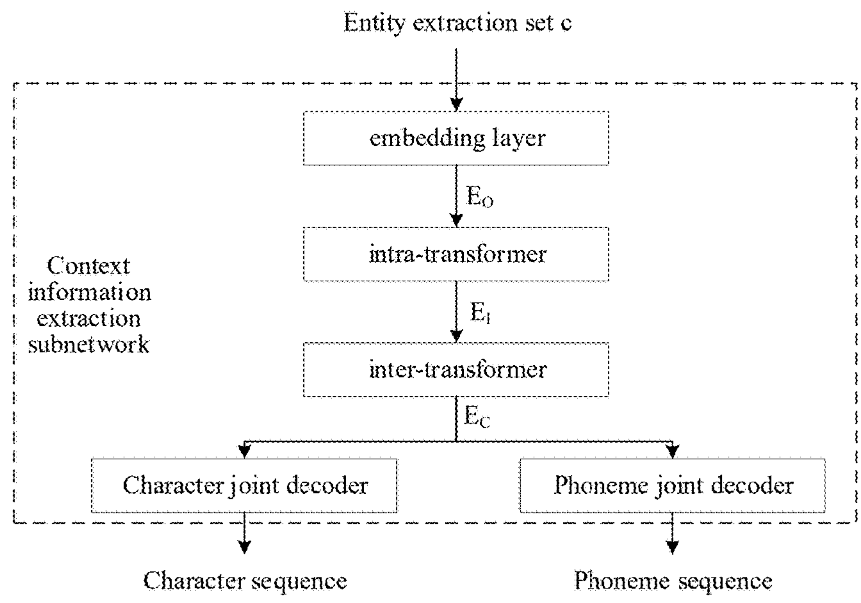
FIG. 9 is a schematic diagram of a structure of a context information extraction subnetwork according to some embodiments.

The context information extraction subnetwork is configured to receive the L entities and generate L context vectors with a fixed dimension. FIG. 9 is a schematic diagram of a structure of a context information extraction subnetwork according to some embodiments. The context information extraction subnetwork includes an embedding layer, an intra-transformer layer, and an inter-transformer layer. The embedding layer is configured to perform feature mapping on an input signal, the intra-transformer layer is configured to calculate an intra-class feature, and the inter-transformer layer is configured to calculate an inter-class feature.

Lengths of all entities are padded, and lengths of L entities may be H. An entity extraction set c including the L entities with the length H is inputted into the context information extraction subnetwork. All entities in the entity extraction set c are mapped via the embedding layer to obtain vectors $E_O$. A dimension of the vector $E_O$ is L×H×D. For the vectors $E_O$, intra-class feature vectors $E_I$, are calculated via the intra-transformer layer of a self-attention transformer module, and a dimension of the vector $E_I$, is L×H×F. A first symbol in H dimension in $E_I$, is used to obtain a fixed-length vector. For L dimensions of the vectors $E_I$, inter-class features are calculated via the inter-transformer layer of another self-attention transformer module to obtain context vectors $E_C$. A character sequence of the context vectors $E_C$ is predicted by a character joint decoder, and a phoneme sequence of the context vectors $E_C$ is predicted by a phoneme joint decoder, and pronunciation information may be introduced in a context vector extractor. This part of a loss function may be calculated by the following formula:

$$L_{embedding} = L_{phone} + L_{char}.$$

$L_{embedding}$ represents a loss function of the embedding layer. $L_{phone}$ represents a loss function of the phoneme joint decoder. $L_{char}$ represents a loss function of the character joint decoder.

154: Use the character recognition information, the non-streaming audio feature corresponding to the N audio frames, and the context information features as inputs of the attention bias character joint subnetwork, and output the text recognition result via the attention bias character joint subnetwork.

The character recognition information of the audio signal, the non-streaming audio feature corresponding to the N audio frames, and the context information features are inputted into the attention bias character joint subnetwork, and the text recognition result is output via the attention bias character joint subnetwork. The attention bias character joint subnetwork includes an attention bias subnetwork and a character joint subnetwork. The character recognition information of the audio signal, the non-streaming audio feature corresponding to the N audio frames, and the context information features are inputted into the attention bias subnetwork, and a character association feature and a non-streaming audio association feature are output via the attention bias subnetwork. The character association feature and the non-streaming audio association feature are inputted into the character joint subnetwork, and the text recognition result is output via the character joint subnetwork.

Figure 10:
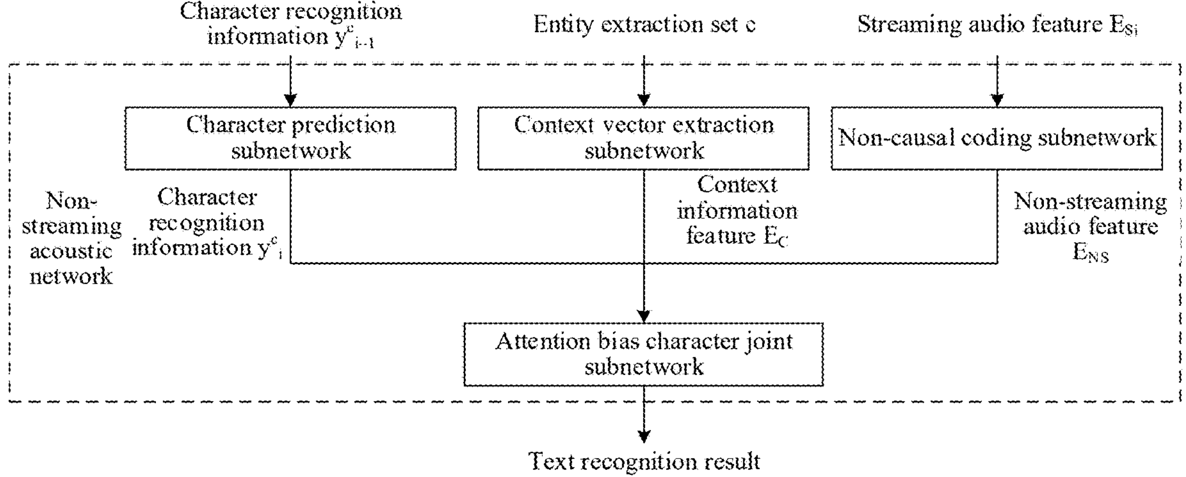
FIG. 10 is a schematic diagram of a non-streaming acoustic network according to some embodiments.

For ease of understanding, FIG. 10 is a schematic diagram of a non-streaming acoustic network according to some embodiments. An (i-1)$^{th}$ piece of character recognition information $$y_{i-1}^{c}$$

is used as an input of a character prediction subnetwork in the non-streaming acoustic network, and an i$^{th}$ piece of character recognition information $$y_{i}^{c}$$

is output via the character prediction subnetwork. An entity extraction set c including L entities is used as an input of a context information extraction subnetwork in the non-streaming acoustic network, and context information features $E_C$ corresponding to the L entities are output via the context information extraction subnetwork. N streaming audio features $E_{Si}$ are used as inputs of a non-causal encoding subnetwork in the non-streaming acoustic network, and a non-streaming audio feature $E_{NS}$ corresponding to the N audio frames is output via the non-causal encoding subnetwork. The character recognition information, the context information features $E_C$ corresponding to the L entities, and the non-streaming audio feature $E_{NS}$ corresponding to the N audio frames are used as inputs of an attention bias character joint subnetwork in the non-streaming acoustic network, and a text recognition result of an audio signal is output via the attention bias character joint subnetwork.

According to the audio processing method provided in some embodiments, a non-streaming acoustic network is established to predict character recognition information corresponding to audio frames in an audio signal by a character prediction subnetwork in the non-streaming acoustic network; a non-streaming audio feature is generated by encoding streaming audio features by a non-causal encoding subnetwork in the non-streaming acoustic network; context information features corresponding to L entities are output via a context information extraction subnetwork in the non-streaming acoustic network; and a text recognition result is output via an attention bias character joint subnetwork in the non-streaming acoustic network, thereby improving accuracy of text recognition.

Figure 11:
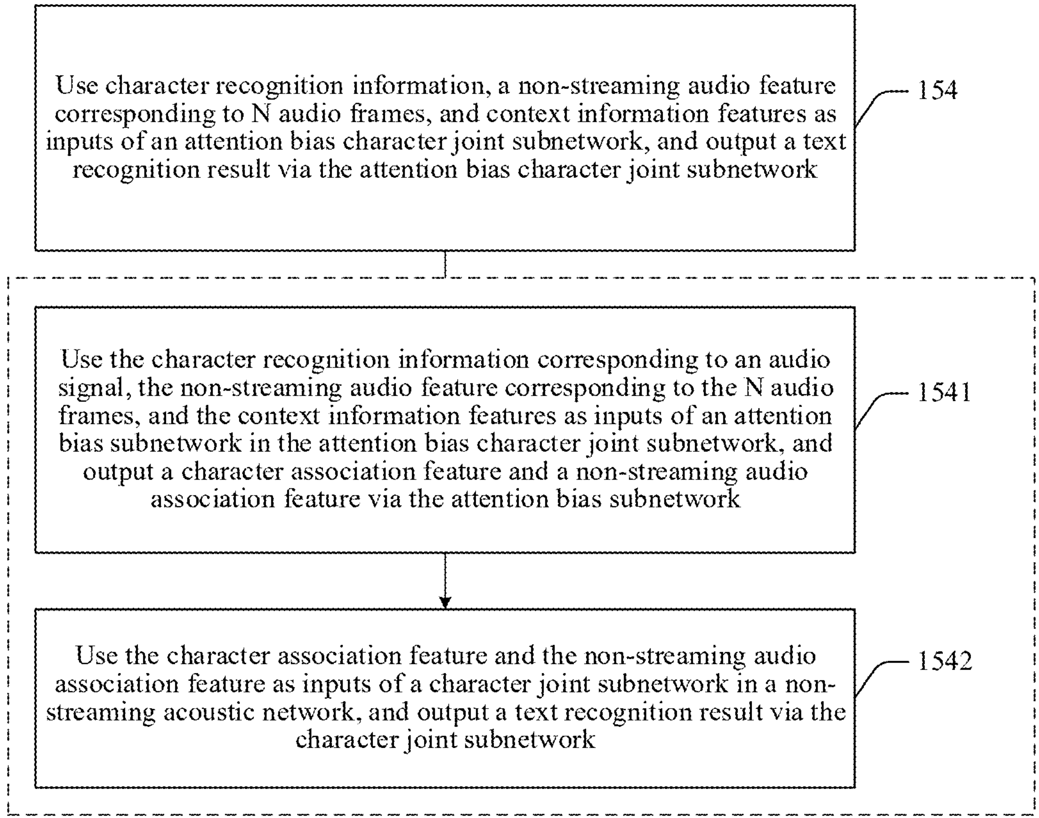
FIG. 11 is a flowchart of an audio processing method according to some embodiments.

In the audio processing method provided in some embodiments as illustrated in FIG. 8, the attention bias character joint subnetwork may include an attention bias subnetwork and a character joint subnetwork. Reference may also be made to FIG. 11. Sub-operation 154 may further include sub-operation 1541 and sub-operation 1542. For example:

1541: Use the character recognition information corresponding to the audio signal, the non-streaming audio feature corresponding to the N audio frames, and the context information features as inputs of the attention bias subnetwork in the attention bias character joint subnetwork, and output a character association feature and a non-streaming audio association feature via the attention bias subnetwork.

The character association feature is configured for representing association between the character recognition information corresponding to the audio signal and the context information features, and the non-streaming audio association feature is configured for representing association between the non-streaming audio feature corresponding to the N audio frames and the context information features.

The audio signal is processed via the character prediction subnetwork to obtain the character recognition information of the audio signal. The streaming audio features corresponding to the N audio frames are processed via the non-causal encoding subnetwork to obtain the non-streaming audio feature corresponding to the N audio frames. The L entities are processed via the context information extraction subnetwork to obtain the context information feature.

The attention bias subnetwork includes a first attention bias subnetwork and a second attention bias subnetwork. The first attention bias subnetwork is configured to process the character recognition information and the context information features to obtain the character association feature. The second attention bias subnetwork is configured to process the non-streaming audio feature and the context information features to obtain the non-streaming audio association feature. The attention bias subnetwork may learn association between a context vector and the audio signal.

The character recognition information corresponding to the audio signal and the context information features are used as inputs of the first attention bias subnetwork in the attention bias character joint subnetwork, and the character association feature is output via the first attention bias subnetwork. The non-streaming audio feature corresponding to the N audio frames and the context information features are used as inputs of the second attention bias subnetwork in the attention bias character joint subnetwork, and the non-streaming audio association feature is output via the second attention bias subnetwork.

1542: Use the character association feature and the non-streaming audio association feature as inputs of the character joint subnetwork in the non-streaming acoustic network, and output the text recognition result via the character joint subnetwork.

The character association feature and non-streaming audio association feature are fused via the character joint subnetwork to obtain the text recognition result. The character association feature is represented in a matrix format. The non-streaming audio association feature is represented in a matrix format. The character association feature in the matrix format and the non-streaming audio association feature in the matrix format are fused via the character joint subnetwork to obtain the text recognition result.

Figure 12:
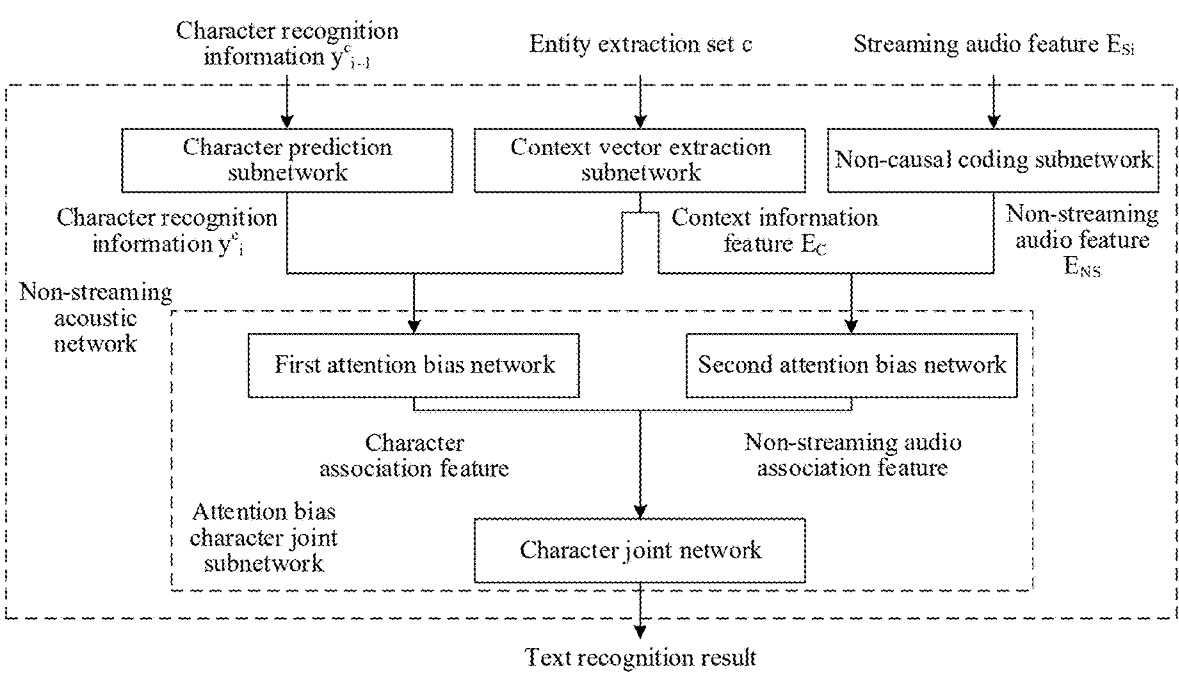
FIG. 12 is a schematic diagram of a processing flow of a non-streaming acoustic network according to some embodiments.

For case of understanding, FIG. 12 is a schematic diagram of a processing flow of a non-streaming acoustic network according to some embodiments. An $(i-1)^{th}$ piece of character recognition information $$y_{i-1}^{c}$$

is used as an input of a character prediction subnetwork in the non-streaming acoustic network, and an $i^{th}$ piece of character recognition information $$y_{i}^{c}$$

is output via the character prediction subnetwork. N streaming audio features $E_{Si}$ are used as inputs of the non-causal encoding subnetwork in the non-streaming acoustic network, and a non-streaming audio feature $E_{NS}$ corresponding to the N audio frames is output via the non-causal encoding subnetwork. An entity extraction set c including L entities is used as an input of a context information extraction subnetwork in the non-streaming acoustic network, and context information features $E_C$ corresponding to the L entities are output via the context information extraction subnetwork. The character recognition information corresponding to an audio signal and the context information features are used as inputs of a first attention bias subnetwork in an attention bias character joint subnetwork, and a character association feature is output via the first attention bias subnetwork. The non-streaming audio feature corresponding to the N audio frames and the context information features are used as inputs of a second attention bias subnetwork in the attention bias character joint subnetwork, and a non-streaming audio association feature is output via the second attention bias subnetwork. The character association feature and the non-streaming audio association feature are used as inputs of a character joint subnetwork in the attention bias character joint subnetwork, and a text recognition result is output via the character joint subnetwork.

According to the audio processing method provided in some embodiments, a non-streaming acoustic network is established to predict character recognition information corresponding to audio frames in an audio signal by a character prediction subnetwork in the non-streaming acoustic network; a non-streaming audio feature is generated by encoding streaming audio features by a non-causal encoding subnetwork in the non-streaming acoustic network; context information features corresponding to L entities are output via a context information extraction subnetwork in the non-streaming acoustic network; similarities between the character recognition information and the context information features are learned via an attention bias subnetwork in the non-streaming acoustic network to obtain a character association feature, and similarities between the non-streaming audio feature and the context information features are learned via the attention bias subnetwork in the non-streaming acoustic network to obtain a non-streaming audio association feature; and feature fusion is performed on the character association feature and the non-streaming audio association feature via a character joint subnetwork to output a text recognition result, thereby improving accuracy of text recognition.

Figure 13:
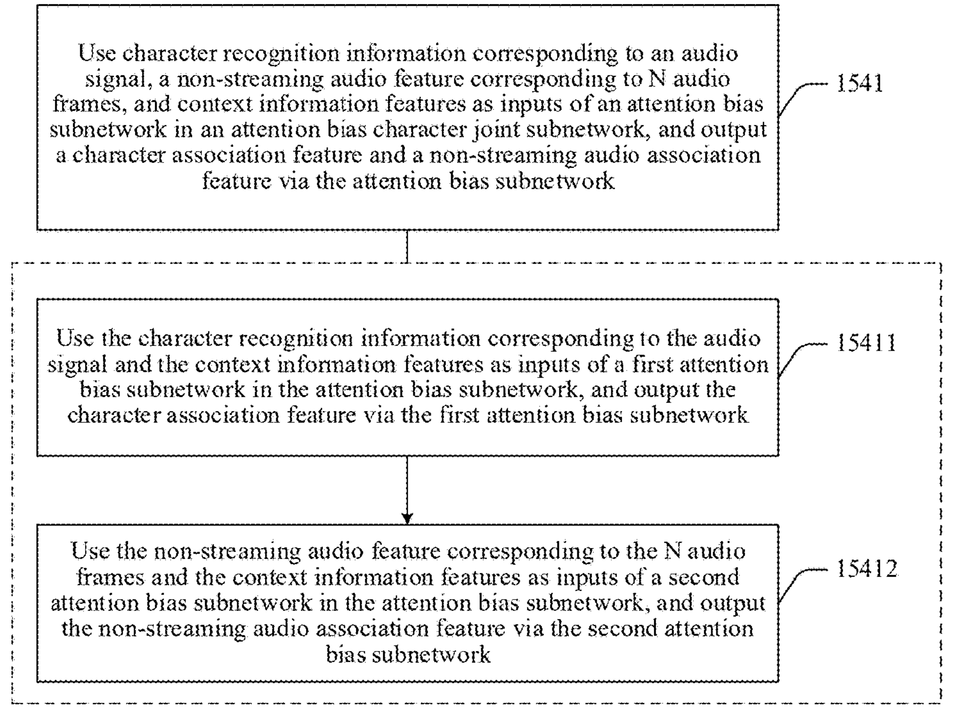
FIG. 13 is a flowchart of an audio processing method according to some embodiments.

In the audio processing method provided in some embodiments as illustrated in FIG. 11, the attention bias subnetwork may include a first attention bias subnetwork and a second attention bias subnetwork. Reference may also be made to FIG. 13. Sub-operation 1541 may further include sub-operation 15411 and sub-operation 15412. For example:

15411: Use the character recognition information corresponding to the audio signal and the context information features as inputs of the first attention bias subnetwork in the attention bias subnetwork, and output the character association feature via the first attention bias subnetwork.

The first attention bias subnetwork is configured to learn correlation between the character recognition information and the context information features. The character recognition information and the context information features are processed by the first attention bias subnetwork to obtain the character association feature. The character association feature represents the correlation between the character recognition information and the context information features.

Figure 14:
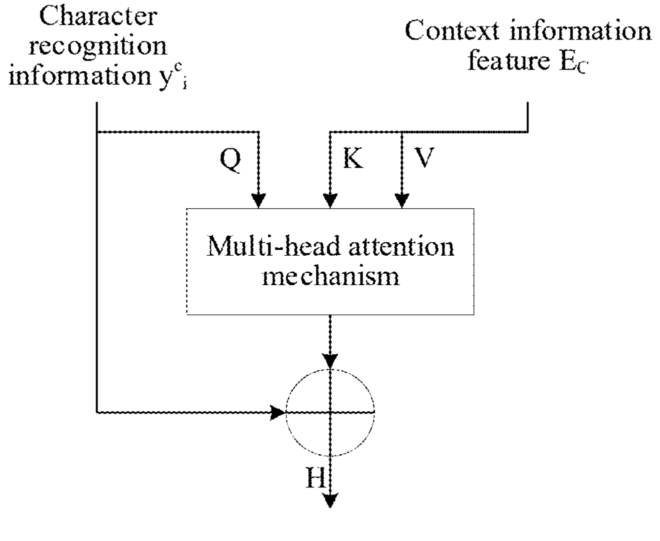
FIG. 14 is a schematic diagram of a first attention bias subnetwork according to some embodiments.

FIG. 14 is a schematic diagram of a first attention bias subnetwork according to some embodiments. An objective of the first attention bias subnetwork is to integrate context information into a transducer model. Character recognition information $$y_{i}^{c}$$

and context information features $E_C$ are used as inputs of the first attention bias subnetwork, and correlation between the character recognition information $$y_{i}^{c}$$

and the context information features $E_C$ is learned via the first attention bias subnetwork. For example, the character recognition information $$y_{i}^{c}$$

is used as an input query vector Q of a multi-head attention (MHA) mechanism, and the context information features $E_C$ are used as a key vector K and a value vector V of the multi-head attention mechanism. A hidden state H is calculated through the multi-head attention mechanism. The hidden state H may be calculated by the following formula:

$$H = \text{softmax}\left(\frac{QE_C^T}{\sqrt{F}}\right)E_C.$$

H is the hidden state. Q represents the query vector, and $$Q = y_i^c \cdot E_C^T$$

is a transpose matrix of the context information features $E_C$. F represents a total of the character recognition information.

15412: Use the non-streaming audio feature corresponding to the N audio frames and the context information features as inputs of the second attention bias subnetwork in the attention bias subnetwork, and output the non-streaming audio association feature via the second attention bias subnetwork.

A parameter of the first attention bias subnetwork is different from a parameter of the second attention bias subnetwork.

The second attention bias subnetwork is configured to learn correlation between the non-streaming audio feature and the context information features. The non-streaming audio feature and the context information features are processed via the second attention bias subnetwork to obtain the non-streaming audio association feature. The non-streaming audio association feature represents the correlation between the non-streaming audio feature and the context information features.

Figure 15:
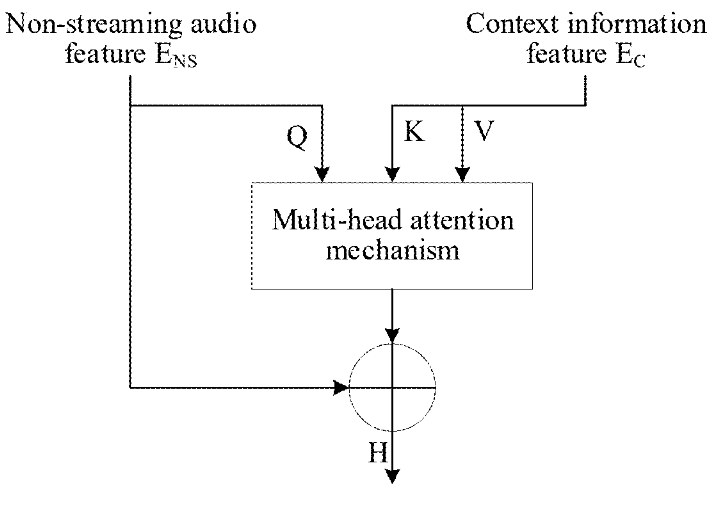
FIG. 15 is a schematic diagram of a second attention bias subnetwork according to some embodiments.

FIG. 15 is a schematic diagram of a second attention bias subnetwork according to some embodiments. An objective of the second attention bias subnetwork is to integrate context information into a transducer model. A non-streaming audio feature $E_{NS}$ and context information features $E_C$ are used as inputs of the second attention bias subnetwork, and correlation between the non-streaming audio feature $E_{NS}$ and the context information features $E_C$ is learned via the second attention bias subnetwork. For example, the non-streaming audio feature $E_{NS}$ is used as an input query vector Q of a multi-head attention (MHA) mechanism, and the context information features $E_C$ are used as a key vector K and a value vector V of the multi-head attention mechanism. A hidden state H is calculated through the multi-head attention mechanism. The hidden state H may be calculated by the following formula:

$$H = \text{softmax}\left(\frac{QE_C^T}{\sqrt{F}}\right)E_C.$$

H is the hidden state. Q represents the query vector, and $$Q = E_{NS} \cdot E_C^T$$

is a transpose matrix of the context information features $E_C$. F represents a total of the character recognition information.

According to the audio processing method provided in some embodiments, a non-streaming acoustic network is established to predict character recognition information corresponding to audio frames in an audio signal by a character prediction subnetwork in the non-streaming acoustic network; a non-streaming audio feature is generated by encoding streaming audio features by a non-causal encoding subnetwork in the non-streaming acoustic network; context information features corresponding to L entities are output via a context information extraction subnetwork in the non-streaming acoustic network; similarities between the character recognition information and the context information features are learned via a first attention bias subnetwork in the non-streaming acoustic network to obtain a character association feature, and similarities between the non-streaming audio feature and the context information features are learned via a second attention bias subnetwork in the non-streaming acoustic network to obtain a non-streaming audio association feature; and feature fusion is performed on the character association feature and the non-streaming audio association feature via a character joint subnetwork to output a text recognition result, thereby improving accuracy of text recognition.

In the audio processing method provided in some embodiments as illustrated in FIG. 8, for an $i^{th}$ audio frame of the N audio frames, reference may also be made to FIG. 16. Sub-operation 151 may further include sub-operation 1511 and sub-operation 1512. For example:

1511: Acquire the $i^{th}$ audio frame in the audio signal and an $(i-1)^{th}$ piece of character recognition information corresponding to an $(i-1)^{th}$ audio frame.

The $(i-1)^{th}$ piece of character recognition information is generated by the character prediction subnetwork based on the $(i-1)^{th}$ audio frame, and i is an integer greater than 1.

1512: Use the $(i-1)^{th}$ piece of character recognition information as an input of the character prediction subnetwork, and output an $i^{th}$ piece of character recognition information via the character prediction subnetwork.

The character prediction subnetwork acquires the $i^{th}$ piece of character recognition information by predicting based on the $(i-1)^{th}$ piece of character recognition information, the character prediction subnetwork acquires the $(i-1)^{th}$ piece of character recognition information by predicting based on an $(i-2)^{th}$ piece of character recognition information, and so on. The character prediction subnetwork is a neural network, and predicts character recognition information of a current frame based on predicted character recognition information of a previous frame. The $(i-1)^{th}$ piece of character recognition information is character recognition information corresponding to a non-empty audio frame closest to the $i^{th}$ audio frame.

According to the audio processing method provided in some embodiments, a character prediction subnetwork predicts current character recognition information based on previous character recognition information, and predicts N audio frames in an audio signal in sequence to obtain character recognition information corresponding to the audio signal, to lay a foundation for improving accuracy of text recognition.

In the audio processing method provided in some embodiments as illustrated in FIG. 8, for a first audio frame of the N audio frames, reference may also be made to FIG. 17. Sub-operation 151 may further include sub-operation 1513 and sub-operation 1514. For example:

1513: Acquire the first audio frame in the audio signal and preset character recognition information.

1514: Use the first audio frame and the preset character recognition information as inputs of the character prediction subnetwork, and output character recognition information corresponding to the first audio frame via the character prediction subnetwork.

The character prediction subnetwork acquires the $i^{th}$ piece of character recognition information by predicting based on the $(i-1)^{th}$ piece of character recognition information, and the character prediction subnetwork acquires the $(i-1)^{th}$ piece of character recognition information by predicting based on an $(i-2)^{th}$ piece of character recognition information. The character recognition information corresponding to the first audio frame in the audio signal is predicted by the character prediction subnetwork based on the preset character recognition information and the first audio frame.

According to the audio processing method provided in some embodiments, a character prediction subnetwork predicts character recognition information of a current frame based on the current frame and character recognition information corresponding to a previous frame, and predicts N audio frames in an audio signal in sequence to obtain character recognition information corresponding to the audio signal, to lay a foundation for improving accuracy of text recognition.

Figure 18:
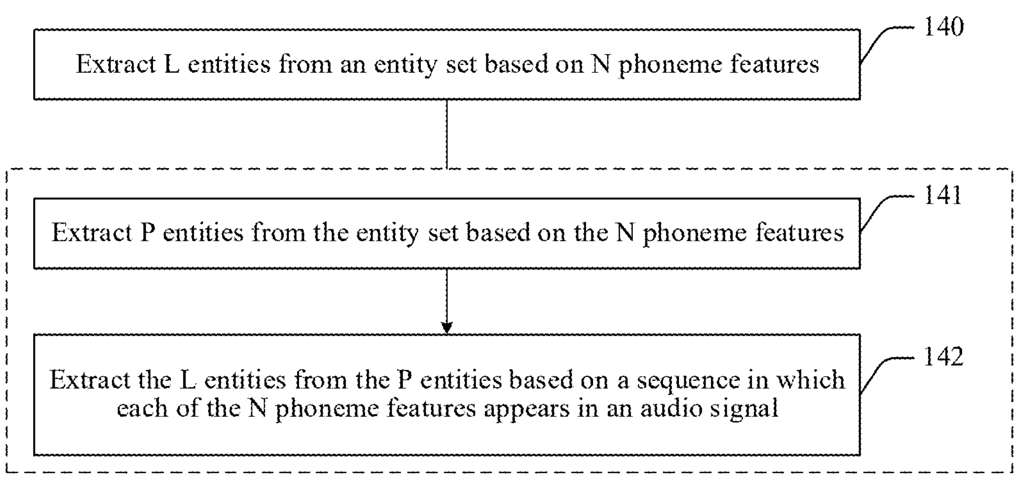
FIG. 18 is a flowchart of an audio processing method according to some embodiments.

In the audio processing method provided in some embodiments as illustrated in FIG. 2, reference may also be made to FIG. 18. Operation 140 may further include sub-operation 141 to sub-operation 142. For example:

141: Extract P entities from the entity set based on the N phoneme features.

Phoneme labels of the P entities are the same as the N phoneme features.

The P entities with the same N phoneme features are selected from the K entities in the entity set based on the N phoneme features. For example, four pieces of phoneme information represented by four phoneme features are “wang”, “fang”, “li”, and “hua”, and 12 entities include 王芳, 王方, 汪芳, 李华, 梨花, 丽华, 方往, 芳华, 王丽, 王华, 张三, and 赵四. 10 entities with the same four phoneme features are selected from the 12 entities in the entity set based on the four phoneme features, and the 10 entities include 王芳, 王方, 汪芳, 李华, 梨花, 丽华, 方往, 芳华, 王丽, and 王华.

142: Extract the L entities from the P entities based on a sequence in which each of the N phoneme features appears in the audio signal.

A sequence of phoneme labels of the L entities are the same as a sequence of the N phoneme features, and P is an integer less than or equal to K and greater than or equal to L.

The L entities are extracted from the P entities based on the sequence in which each of the N phoneme features appears in the audio signal and phoneme information corresponding to the entities. For example, four pieces of phoneme information represented by four phoneme features are “wang”, “fang”, “li”, and “hua”, and a sequence in which the four pieces of phoneme information appear in the audio signal is that the first one is “wang”, the second one is “fang”, the third one is “li”, and the fourth one is “hua”. Six entities are selected from 10 entities based on the sequence in which the four pieces of phoneme features appear in the audio signal and phoneme information corresponding to the entities, and the six entities include 王芳, 王方, 汪芳, 李华, 梨花, and 丽华.

The audio processing method provided in some embodiments, in a process of extracting an entity, entities with the same phoneme features are extracted from an entity set, and entities with the same sequence in which the phoneme features appear in an audio signal may be extracted from the extracted entities. Compared with directly extracting entities with the same phoneme features and the same sequence in which the phoneme features appear in the audio signal from the entity set, an amount of calculation is reduced and speed of entity extraction is improved.

Figure 19:
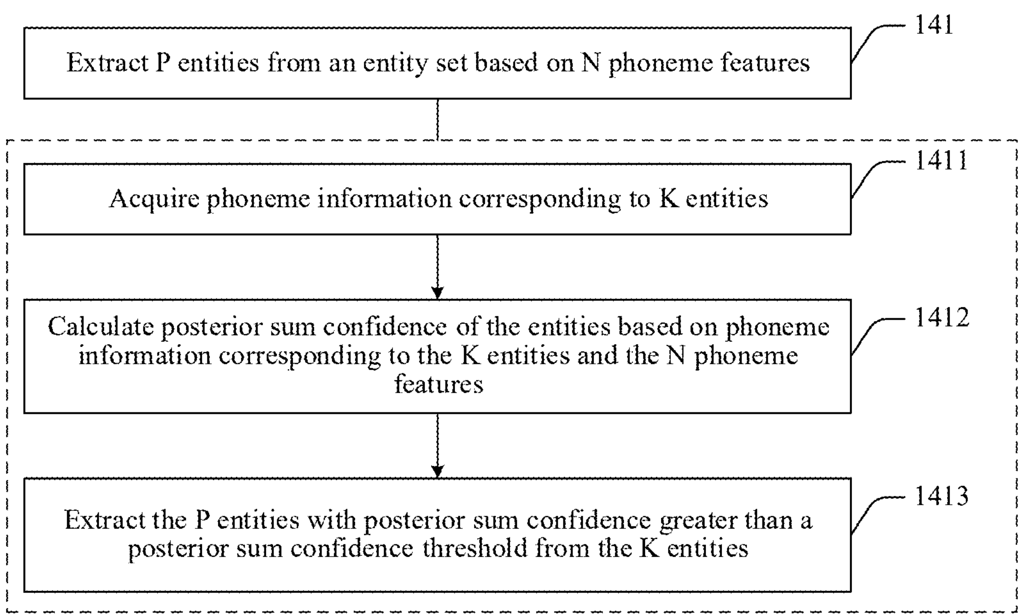
FIG. 19 is a flowchart of an audio processing method according to some embodiments.

In the audio processing method provided in some embodiments as illustrated in FIG. 18, reference may be made to FIG. 19. Sub-operation 141 may further include sub-operation 1411 to sub-operation 1413. For example:

1411: Acquire phoneme information corresponding to the K entities.

1412: Calculate posterior sum confidence of the entities based on the phoneme information corresponding to the K entities and the N phoneme features.

The posterior sum confidence is configured for representing similarities between the entities and the N phoneme features.

1413: Extract P entities with posterior sum confidence greater than a posterior sum confidence threshold from the K entities.

According to the audio processing method provided in some embodiments, the process of extracting an entity includes two parts. The first part is to calculate posterior sum confidence (PSC) of entities. PSC involves whether a sequence in which phonemes appear in the entities appears in a sliding window, may not focus on the sequence in which the phonemes appear. Calculation at this stage may facilitate quickly filtering out of an irrelevant entity. For example, for a posterior matrix (a size of T×F, for example, there are T time frames, and each frame has F phoneme categories) in the sliding window and candidate entity A (including B phonemes), according to some embodiments, these B phonemes are processed in sequence, a corresponding column is found in F dimension of the posterior matrix and a maximum value is taken in T dimension, and confidence is recorded (for example, maximum confidence of a corresponding phoneme in a T frame is found). When all B phonemes are processed in sequence, the recorded confidence is added up and divided by B to obtain average confidence. The confidence is PSC of the candidate entity A, and a threshold is set to determine whether the entity is filtered out. For each entity in an entity library, PSC is calculated and filtering is performed accordingly.

The audio processing method provided in some embodiments, in a process of extracting an entity, posterior sum confidence of entities is calculated, and further entities with the same phoneme features are extracted from an entity set, and time consumption of entity extraction may be reduced and speed of entity extraction may be improved.

Figures 20, 21:
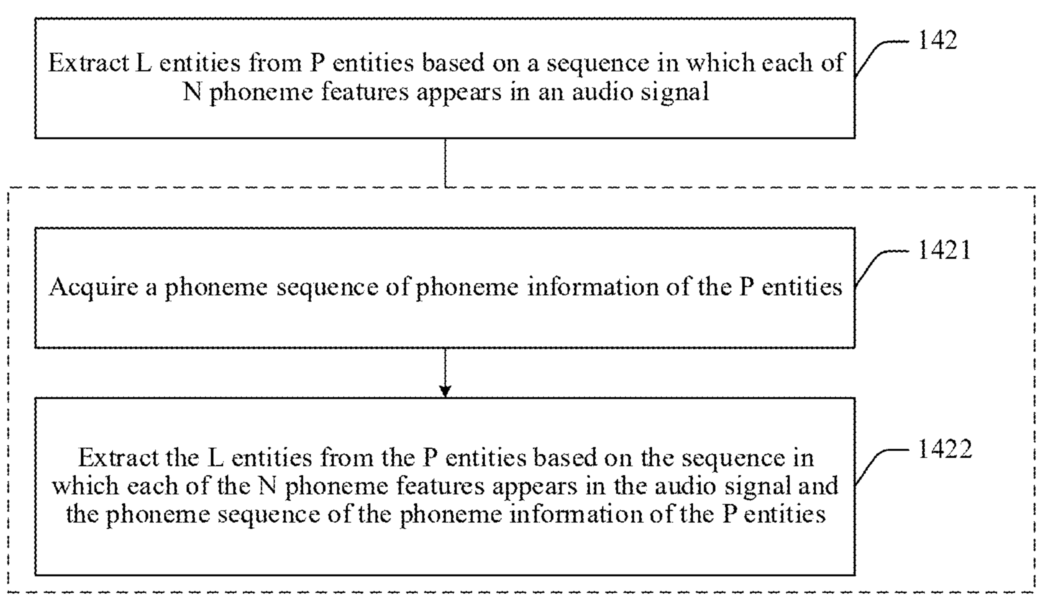
FIG. 20 is a flowchart of an audio processing method according to some embodiments.
FIG. 21 is a schematic diagram of a structure of an audio processing apparatus according to some embodiments.

In the audio processing method provided in some embodiments as illustrated in FIG. 18, reference may also be made to FIG. 20. Sub-operation 142 may further include sub-operation 1421 to sub-operation 1422. For example:

1421: Acquire a phoneme sequence of phoneme information of the P entities.

1422: Extract the L entities from the P entities based on the sequence in which each of the N phoneme features appears in the audio signal and the phoneme sequence of the phoneme information of the P entities.

According to the audio processing method provided in some embodiments, the process of extracting an entity includes two parts. The second part is to calculate sequence order confidence (SOC) of entities. Calculation of the sequence order confidence is implemented by using a dynamic programming algorithm. The sequence order confidence focuses on a sequence in which phonemes of a candidate entity appear. The sequence in which the phonemes of the entity appear is compared with the sequence in which the phoneme features appear in the audio signal to further extract the L entities from the P entities.

The audio processing method provided in some embodiments, in a process of extracting an entity, sequence order confidence of entities is calculated, and further entities with the same phoneme features and phoneme sequence are extracted from an entity set, and time consumption of entity extraction, speed of entity extraction, and accuracy of entity extraction, may be improved.

Three experiments are performed based on the audio processing method provided in some embodiments. Experiment 1 is to explore an impact of the solution proposed by some embodiments on recognition performance. Experiment 2 further analyzes performance of an entity extraction network. Experiment 3 analyzes running time-consuming performance of the method provided in some embodiments.

Table 1 shows an experimental result of experiment 1 that explores the impact of the solution proposed in some embodiments on the recognition performance. An experimental test set includes a contact scenario and a music retrieval scenario. Each sentence in the test set includes at least one entity. An original entity library of the contact scenario includes 970 people name entities, and an original entity library of the music retrieval scenario includes 6253 song title/singer name entities. Evaluation indexes of this experiment are CER and CERR. CER represents a character error rate. Lower CER may indicate better recognition performance. CERR is relative improvement of CER. Higher CERR may indicate better recognition performance. ASR frameworks of the experiments may be the same. Baseline represents an ASR framework. The ASR framework may not include a context vector extraction subnetwork and an attention bias subnetwork. Baseline+blank list represents that the context vector extraction subnetwork and the attention bias subnetwork are added to the ASR framework, and an input entity list is blank during reasoning. Baseline+full list represents that the context vector extraction subnetwork and the attention bias subnetwork are added to the ASR framework, and an input list is an original entity library during reasoning. Baseline+PSC represents that the context vector extraction subnetwork, the attention bias subnetwork, and an entity extraction network are added to the ASR framework, and the entity extraction network performs a first stage of a PSC calculation process. Baseline+PSC+PSC represents that the context vector extraction subnetwork, the attention bias subnetwork, and the entity extraction network are added to the ASR framework, and the entity extraction network performs the first stage of PSC calculation process and an SOC calculation process. topline represents the context vector extraction subnetwork is added to the ASR framework, and for each test sample, entities included in a transcript are used as an entity list.

It may be learned from the experimental result that the entire entity library being used as an input can achieve relative improvement of 30% when a total quantity of entities is small (the contact scenario), but when a total quantity of entities increases (the music retrieval scenario), performance drops sharply. There may be no benefit compared with Baseline. The entity filtering solution proposed in some embodiments can achieve significant improvement in the two scenarios, and is closer to performance of topline. The solution in which the two stages are used may provide improvements over the solution in which only PSC is used.

TABLE 1

| | Music retrieval scenario | | Contact scenario | |
|---|---|---|---|---|
| | CER (%)↓ | CERR (%)↑ | CER (%)↓ | CERR (%)↑ |
| Baseline | 2.51 | | 10.22 | |
| Baseline + blank list | 2.65 | −5.5 | 9.99 | 2.2 |
| Baseline + full list | 2.52 | −0.3 | 7.13 | 30.2 |
| Baseline + PSC | 2.07 | 17.5 | 6.19 | 39.4 |
| Baseline + PSC + SOC | 2.00 | 20.3 | 6.01 | 41.1 |
| topline | 1.66 | 33.8 | 4.81 | 52.9 |

Table 2 shows an experimental result of experiment 2. Experiment 2 further analyzes performance of an entity filtering network. This experiment uses ERR and ALS to evaluate performance of a filtering algorithm. ERR represents an average probability (a recall rate) of entity retention in a test transcript after filtering. ALS represents an average size of an entity list after filtering. Higher ERR may indicate better performance of the entity filtering network, and smaller ALS may indicate better performance of the entity filtering network. It may be learned from the experimental result that compared with the original entity library, calculating PSC of entities can filter out irrelevant entities and maintain high ERR. Calculating PSC and SOC of entities can further compress a size of the entity list. However, a small amount of ERR is sacrificed, and overall recognition performance can be further improved.

TABLE 2

| | Music retrieval scenario | | Contact scenario | |
|---|---|---|---|---|
| | ERR (%)↑ | ALS↓ | ERR (%)↑ | ALS↓ |
| Original list | | 6253 | | 972 |
| +PSC | 96.04 | 17 | 92.88 | 12.7 |
| +PSC + SOC | 94.36 | 3.7 | 91.19 | 2.8 |

Table 3 shows an experimental result of experiment 3. Experiment 3 further analyzes the running time-consuming performance of the method provided in some embodiments. A system real-time factor (RTF) is used as an evaluation index. A test environment is single-threaded 2.50 GHZ Intel® Xeon® Platinum 8255C CPU. It may be learned from the experimental result that when the entity filtering solution is not used, when a quantity of input entity libraries increases (where the contact scenario is compared with the music retrieval scenario, 970→6253), RTF drops significantly to a level (0.196→4.67) indicating unavailability. The entity filtering solution proposed in some embodiments is used, and RTF may be controlled. Even if the size the entity library is more than 6000, RTF can be stable within 0.15.

TABLE 3

| | RTF↓ | |
|---|---|---|
| | Music retrieval scenario | Contact scenario |
| Original list | 4.670 | 0.196 |
| +PSC | 0.147 | 0.106 |
| +PSC + SOC | 0149 | 0.107 |
| Test set duration | 8866 | 3215 |

The following describes an audio processing apparatus in some embodiments. FIG. 21 is a schematic diagram of an audio processing apparatus 20 according to some embodiments. The audio processing apparatus 20 may include an audio signal acquiring module 210, a streaming acoustic network processing module 220, an entity set acquiring module 230, an entity extraction module 240, and a non-streaming acoustic network processing module 250. For example:

the audio signal acquiring module 210 is configured to obtain an audio signal.

The audio signal includes N audio frames, and N is an integer greater than 1.

The streaming acoustic network processing module 220 is configured to input the N audio frames into a streaming acoustic network to obtain N phoneme features and N streaming audio features.

The N phoneme features are configured for representing phoneme information of the audio signal.

The entity set acquiring module 230 is configured to acquire an entity set.

The entity set includes K entities, the K entities correspond to K pieces of phoneme information, and K is an integer greater than 1.

The entity extraction module 240 is configured extract L entities from the entity set based on the N phoneme features.

The L entities correspond to the N phoneme features, and L is an integer greater than or equal to N and less than or equal to K.

The non-streaming acoustic network processing module 250 is configured to input the N audio frames, the N streaming audio features, and the L entities into a non-streaming acoustic network to obtain a text recognition result of the audio signal.

According to the audio processing apparatus provided in some embodiments, a streaming acoustic network is established to predict N phoneme features and N streaming audio features corresponding to N audio frames in an audio signal; L entities that have correspondences with the N phoneme features are extracted from an entity set based on the obtained N phoneme features; and a text recognition result of the audio signal is predicted by a non-streaming acoustic network based on the N audio frames, the N streaming audio features, and the L entities, thereby improving accuracy of text recognition.

In the audio processing apparatus provided in some embodiments as illustrated in FIG. 21, the streaming acoustic network processing module 220 is further configured to:

perform feature extraction on the N audio frames to obtain N audio frame features;

use each of the N audio frame features as an input of a causal encoding subnetwork in the streaming acoustic network, and output streaming audio features respectively corresponding to the N audio frame features via the causal encoding subnetwork;

use each of the N audio frames as an input of the phoneme prediction subnetwork in the streaming acoustic network, and output phoneme recognition information corresponding to the N audio frames via the phoneme prediction subnetwork; and input the streaming audio features and the phoneme recognition information into the phoneme joint subnetwork in the streaming acoustic network, and output N phoneme features via the phoneme joint subnetwork.

According to the audio processing apparatus provided in some embodiments, a streaming acoustic network is established to predict phoneme recognition information corresponding to audio frames in an audio signal by a phoneme prediction subnetwork in the streaming acoustic network; streaming audio features are generated by encoding audio frame features by a causal encoding subnetwork in the streaming acoustic network; and phoneme features are generated by fusing the streaming audio features and the phoneme recognition information by the phoneme joint subnetwork in the streaming acoustic network, thereby improving accuracy of text recognition.

In the audio processing apparatus provided in some embodiments as illustrated in FIG. 21, for an $i^{th}$ audio frame of the N audio frames, the streaming acoustic network processing module 220 is further configured to:

acquire the $i^{th}$ audio frame and an $(i-1)^{th}$ piece of phoneme recognition information corresponding to an $(i-1)^{th}$ audio frame, the $(i-1)^{th}$ piece of phoneme recognition information being generated by the phoneme prediction subnetwork based on the $(i-1)^{th}$ audio frame, and i being an integer greater than 1; and use the $i^{th}$ audio frame and the $(i-1)^{th}$ piece of phoneme recognition information as inputs of the phoneme prediction subnetwork, and output phoneme recognition information corresponding to the $i^{th}$ audio frame via the phoneme prediction subnetwork.

According to the audio processing apparatus provided in some embodiments, a phoneme prediction subnetwork predicts phoneme recognition information of a current frame based on the current frame and phoneme recognition information corresponding to a previous frame, and predicts N audio frames in sequence to obtain N pieces of phoneme recognition information corresponding to the N audio frames, to lay a foundation for improving accuracy of text recognition.

In the audio processing apparatus provided in some embodiments as illustrated in FIG. 21, for a first audio frame of the N audio frames, the streaming acoustic network processing module 220 may be further configured to:

acquire the first audio frame and preset phoneme recognition information; and use the first audio frame and the preset phoneme recognition information as inputs of the phoneme prediction subnetwork, and output phoneme recognition information corresponding to the first audio frame via the phoneme prediction subnetwork.

According to the audio processing apparatus provided in some embodiments, a phoneme prediction subnetwork predicts phoneme recognition information of a current frame based on the current frame and phoneme recognition information corresponding to a previous frame, and predicts N audio frames in sequence to obtain N pieces of phoneme recognition information corresponding to the N audio frames, to lay a foundation for improving accuracy of text recognition.

In the audio processing apparatus provided in some embodiments as illustrated in FIG. 21, the non-streaming acoustic network processing module 250 may be further configured to:

use each of the N audio frames as an input of a character prediction subnetwork in the non-streaming acoustic network, and output character recognition information corresponding to the N audio frames via the character prediction subnetwork;

use the N streaming audio features as inputs of a non-causal encoding subnetwork in the non-streaming acoustic network, and output a non-streaming audio feature corresponding to the N audio frames via the non-causal encoding subnetwork;

use the L entities as inputs of a context information extraction subnetwork in the non-streaming acoustic network, and output context information features corresponding to the L entities via the context information extraction subnetwork; and use the character recognition information corresponding to the N audio frames, the non-streaming audio feature corresponding to the N audio frames, and the context information features as inputs of an attention bias character joint subnetwork, and output the text recognition result via the attention bias character joint subnetwork.

According to the audio processing apparatus provided in some embodiments, a non-streaming acoustic network is established to predict character recognition information corresponding to audio frames in an audio signal by a character prediction subnetwork in the non-streaming acoustic network; a non-streaming audio feature is generated by encoding streaming audio features by a non-causal encoding subnetwork in the non-streaming acoustic network; context information features corresponding to L entities are output via a context information extraction subnetwork in the non-streaming acoustic network; and a text recognition result is output via an attention bias character joint subnetwork in the non-streaming acoustic network, thereby improving accuracy of text recognition.

In the audio processing apparatus provided in some embodiments as illustrated in FIG. 21, the non-streaming acoustic network processing module 250 may be further configured to:

use the character recognition information corresponding to the N audio frames, the non-streaming audio feature corresponding to the N audio frames, and the context information features as inputs of an attention bias subnetwork in the attention bias character joint subnetwork, and output a character association feature and a non-streaming audio association feature via the attention bias subnetwork, the character association feature being configured for representing association between the character recognition information corresponding to the N audio frames and the context information features, and the non-streaming audio association feature being configured for representing association between the non-streaming audio feature corresponding to the N audio frames and the context information features; and use the character association feature and the non-streaming audio association feature as inputs of a character joint subnetwork in the non-streaming acoustic network, and output the text recognition result via the character joint subnetwork.

According to the audio processing apparatus provided in some embodiments, a non-streaming acoustic network is established to predict character recognition information corresponding to audio frames in an audio signal by a character prediction subnetwork in the non-streaming acoustic network; a non-streaming audio feature is generated by encoding streaming audio features by a non-causal encoding subnetwork in the non-streaming acoustic network; context information features corresponding to L entities are output via a context information extraction subnetwork in the non-streaming acoustic network; similarities between the character recognition information and the context information features are learned via an attention bias subnetwork in the non-streaming acoustic network to obtain a character association feature, and similarities between the non-streaming audio feature and the context information features are learned via the attention bias subnetwork in the non-streaming acoustic network to obtain a non-streaming audio association feature; and feature fusion is performed on the character association feature and the non-streaming audio association feature via a character joint subnetwork to output a text recognition result, thereby improving accuracy of text recognition.

In the audio processing apparatus provided in some embodiments as illustrated in FIG. 21, the non-streaming acoustic network processing module 250 may be further configured to:

use the character recognition information corresponding to the N audio frames and the context information features as inputs of a first attention bias subnetwork in the attention bias subnetwork, and output the character association feature via the first attention bias subnetwork; and use the non-streaming audio feature corresponding to the N audio frames and the context information features as inputs of a second attention bias subnetwork in the attention bias subnetwork, and output the non-streaming audio association feature via the second attention bias subnetwork, a parameter of the first attention bias subnetwork being different from a parameter of the second attention bias subnetwork.

According to the audio processing apparatus provided in some embodiments, a non-streaming acoustic network is established to predict character recognition information corresponding to audio frames in an audio signal by a character prediction subnetwork in the non-streaming acoustic network; a non-streaming audio feature is generated by encoding streaming audio features by a non-causal encoding subnetwork in the non-streaming acoustic network; context information features corresponding to L entities are output via a context information extraction subnetwork in the non-streaming acoustic network; similarities between the character recognition information and the context information features are learned via a first attention bias subnetwork in the non-streaming acoustic network to obtain a character association feature, and similarities between the non-streaming audio feature and the context information features are learned via a second attention bias subnetwork in the non-streaming acoustic network to obtain a non-streaming audio association feature; and feature fusion is performed on the character association feature and the non-streaming audio association feature via a character joint subnetwork to output a text recognition result, thereby improving accuracy of text recognition.

In the audio processing apparatus provided in some embodiments as illustrated in FIG. 21, for an $i^{th}$ audio frame of the N audio frames, the non-streaming acoustic network processing module 250 may be further configured to:

acquire the $i^{th}$ audio frame and an $(i-1)^{th}$ piece of character recognition information corresponding to an $(i-1)^{th}$ audio frame, the $(i-1)^{th}$ piece of character recognition information being generated by the character prediction subnetwork based on the $(i-1)^{th}$ audio frame, and i being an integer greater than 1; and use the $i^{th}$ audio frame and the $(i-1)^{th}$ piece of character recognition information as inputs of the character prediction subnetwork, and output character recognition information corresponding to the $i^{th}$ audio frame via the character prediction subnetwork.

According to the audio processing apparatus provided in some embodiments, a character prediction subnetwork predicts character recognition information of a current frame based on the current frame and character recognition information corresponding to a previous frame, and predicts N audio frames in sequence to obtain N pieces of character recognition information corresponding to the N audio frames, to lay a foundation for improving accuracy of text recognition.

In the audio processing apparatus provided in some embodiments as illustrated in FIG. 21, for a first audio frame of the N audio frames, the non-streaming acoustic network processing module 250 may be further configured to:

acquire the first audio frame and preset character recognition information; and use the first audio frame and the preset character recognition information as inputs of the character prediction subnetwork, and output character recognition information corresponding to the first audio frame via the character prediction subnetwork.

According to the audio processing apparatus provided in some embodiments, a character prediction subnetwork predicts character recognition information of a current frame based on the current frame and character recognition information corresponding to a previous frame, and predicts N audio frames in sequence to obtain N pieces of character recognition information corresponding to the N audio frames, to lay a foundation for improving accuracy of text recognition.

In the audio processing apparatus provided in some embodiments as illustrated FIG. 21, the entity extraction module 240 may be further configured to:

extract P entities from the entity set based on the N phoneme features, phoneme labels of the P entities being the same as the N phoneme features; and extract the L entities from the P entities based on a sequence in which each of the N phoneme features appears in the audio signal, a sequence of phoneme labels of the L entities being the same as a sequence of the N phoneme features, and P being an integer less than or equal to K and greater than or equal to L.

The audio processing apparatus provided in some embodiments, in a process of extracting an entity, entities with the same phoneme features are extracted from an entity set, and entities with the same sequence in which the phoneme features appear in an audio signal may be extracted from the extracted entities. Compared with directly extracting entities with the same phoneme features and the same sequence in which the phoneme features appear in the audio signal from the entity set, an amount of calculation is reduced and speed of entity extraction is improved.

In the audio processing apparatus provided in some embodiments as illustrated in FIG. 21, the entity extraction module 240 may be further configured to:

acquire phoneme information corresponding to the K entities;

calculate posterior sum confidence of the entities based on the phoneme information corresponding to the K entities and the N phoneme features, the posterior sum confidence is configured for representing similarities between the entities and the N phoneme features; and extract P entities with posterior sum confidence greater than a posterior sum confidence threshold from the K entities.

The audio processing apparatus provided in some embodiments, in a process of extracting an entity, posterior sum confidence of entities is calculated, and further entities with the same phoneme features are extracted from an entity set, and time consumption of entity extraction may be reduced, and speed of entity extraction may be improved.

In the audio processing apparatus provided in some embodiments as illustrated in FIG. 21, the entity extraction module 240 may be further configured to:

acquire a phoneme sequence of phoneme information of the P entities; and extract the L entities from the P entities based on the sequence in which each of the N phoneme features appears in the audio signal and the phoneme sequence of the phoneme information of the P entities.

The audio processing apparatus provided in some embodiments, in a process of extracting an entity, sequence order confidence of entities is calculated, and further entities with the same phoneme features and phoneme sequence are extracted from an entity set, and time consumption of entity extraction, speed of entity extraction, and accuracy of entity extraction, may be improved.

According to some embodiments, each module may exist respectively or be combined into one or more modules. Some modules may be further split into multiple smaller function subunits, thereby implementing the same operations without affecting the technical effects of some embodiments. The modules are divided based on logical functions. In application, a function of one module may be realized by multiple modules, or functions of multiple modules may be realized by one module. In some embodiments, the apparatus may further include other modules. In application, these functions may also be realized cooperatively by the other modules, and may be realized cooperatively by multiple modules.

A person skilled in the art would understand that these "modules" could be implemented by hardware logic, a processor or processors executing computer software code, or a combination of both. The "modules" may also be implemented in software stored in a memory of a computer or a non-transitory computer-readable medium, where the instructions of each module are executable by a processor to thereby cause the processor to perform the respective operations of the corresponding module.

Figure 22:
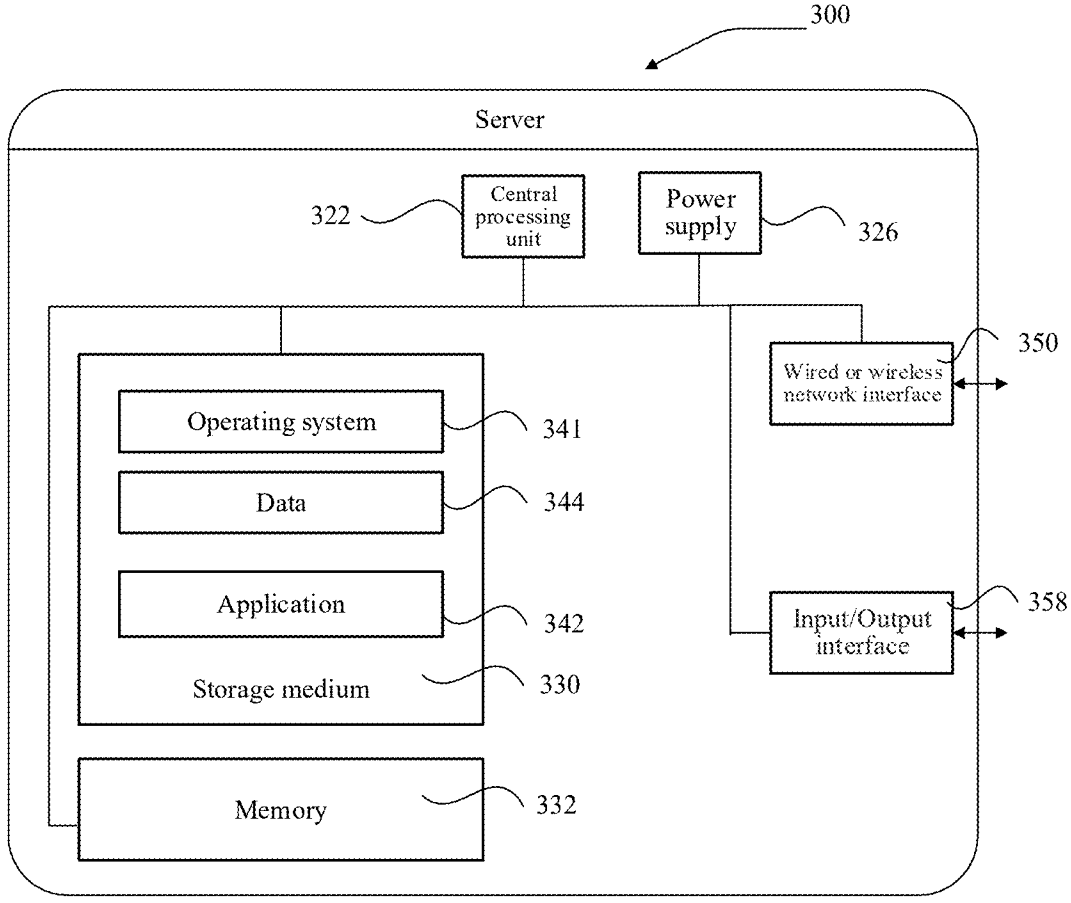
FIG. 22 is a schematic diagram of a structure of a server according to some embodiments.

FIG. 22 is a schematic diagram of a structure of a server according to some embodiments. The server 300 may vary greatly due to different configurations or performance, and may include one or more central processing units (CPU) 322 (for example, one or more processors) and a memory 332, and one or more storage media 330 (for example, one or more mass storage devices) that store application programs 342 or data 344. The memory 332 and the storage medium 330 may be used for temporary storage or persistent storage. A program stored in the storage medium 330 may include one or more modules, and each module may include a series of instruction operations on the server. Further, the central processing unit 322 may be configured to communicate with the storage medium 330 and perform on the server 300 the series of instruction operations in the storage medium 330.

The server 300 may further include one or more power supplies 326, one or more wired or wireless network interfaces 350, one or more input/output interfaces 358, and/or one or more operating systems 341, such as, Windows-Server™, MacOSX™, Unix™, Linux™, or FreeBSD™.

Operations performed by the server in the foregoing embodiments may be based on the structure of the server shown in FIG. 22.

In addition, some embodiments provide a storage medium, the storage medium is configured to store a computer program, and the computer program is configured for performing the method according to the foregoing embodiments.

Some embodiments provide a computer program product including a computer program, and the computer program, when running on a computer, causes the computer to perform the method according to some embodiments.

A person skilled in the art may clearly understand that, for work processes of the foregoing described system, apparatus, and unit, reference may be made to descriptions of the method according to some embodiments.

When the integrated unit is implemented in the form of a software functional unit and sold or used as an independent product, the integrated unit may be stored in a computer-readable storage medium. Based on such an understanding, the technical solutions of some embodiments, or the part contributing to the related art, all or a part of the technical solutions may be implemented in a form of a software product. The computer software product is stored in a storage medium, and includes several instructions for instructing a computer device (which may be a personal computer, a server, a network device, or the like) to perform all or a part of the operations of the method according to some embodiments. The foregoing storage medium may include a medium that can store program code, such as a USB flash drive, a removable hard disk, a read-only memory (ROM), a random access memory (RAM), or an optical disc, for example, however, the disclosure is not limited thereto.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. An audio processing method, performed by a computer device, comprising:

acquiring an audio signal comprising one or more audio frames;

inputting the one or more audio frames into a streaming acoustic network to obtain one or more phoneme features representing phoneme information of the audio signal and one or more streaming audio features;

acquiring an entity set comprising one or more first entities, wherein the one or more first entities correspond to one or more pieces of phoneme information;

extracting one or more second entities from the entity set based on the one or more phoneme features, wherein the one or more second entities correspond to the one or more phoneme features, and wherein a second number of the one or more second entities is greater than or equal to a third number of the one or more audio frames and less than or equal to a first number of the one or more first entities;

obtaining a text recognition result based on inputting the audio signal, the one or more streaming audio features, and the one or more second entities into a non-streaming acoustic network; and outputting the text recognition result.

2. The audio processing method according to claim 1, wherein the streaming acoustic network comprises a causal encoding subnetwork, a phoneme prediction subnetwork, and a phoneme joint subnetwork, and wherein the inputting the one or more audio frames comprises:

performing feature extraction on the one or more audio frames to obtain one or more audio frame features;

inputting the one or more audio frame features into the causal encoding subnetwork in the streaming acoustic network, and outputting streaming audio features corresponding to the one or more audio frame features via the causal encoding subnetwork;

inputting the one or more audio frames into the phoneme prediction subnetwork, and outputting first phoneme recognition information corresponding to the one or more audio frames via the phoneme prediction subnetwork; and inputting the streaming audio features and the first phoneme recognition information into the phoneme joint subnetwork, and outputting the one or more phoneme features via the phoneme joint subnetwork.

3. The audio processing method according to claim 2, wherein, for an $i^{th}$ audio frame of the one or more audio frames, the inputting the one or more audio frames comprises:

acquiring the $i^{th}$ audio frame and an $(i-1)^{th}$ piece of phoneme recognition information corresponding to an $(i-1)^{th}$ audio frame, wherein the $(i-1)^{th}$ piece of phoneme recognition information is generated by the phoneme prediction subnetwork based on the $(i-1)^{th}$ audio frame; and inputting the $i^{th}$ audio frame and the $(i-1)^{th}$ piece of phoneme recognition information into the phoneme prediction subnetwork, and outputting second phoneme recognition information corresponding to the $i^{th}$ audio frame via the phoneme prediction subnetwork, and wherein i is an integer greater than 1.

4. The audio processing method according to claim 2, wherein for a first audio frame of the one or more audio frames, the inputting the one or more audio frames into the phoneme prediction subnetwork comprises:

acquiring the first audio frame and preset phoneme recognition information; and inputting the first audio frame and the preset phoneme recognition information into the phoneme prediction subnetwork, and outputting second phoneme recognition information corresponding to the first audio frame via the phoneme prediction subnetwork.

5. The audio processing method according to claim 1, wherein the non-streaming acoustic network comprises a character prediction subnetwork, a non-causal encoding subnetwork, a context information extraction subnetwork, and an attention bias character joint subnetwork, and wherein the obtaining the text recognition result comprises:

inputting the audio signal into the character prediction subnetwork, and outputting first character recognition information corresponding to the audio signal via the character prediction subnetwork;

inputting the one or more streaming audio features into the non-causal encoding subnetwork, and outputting a non-streaming audio feature corresponding to the one or more audio frames via the non-causal encoding subnetwork;

inputting the one or more second entities as into the context information extraction subnetwork, and outputting context information features corresponding to the one or more second entities via the context information extraction subnetwork; and inputting the first character recognition information, the non-streaming audio feature, and the context information features into the attention bias character joint subnetwork, and outputting the text recognition result via the attention bias character joint subnetwork.

6. The audio processing method according to claim 5, wherein the attention bias character joint subnetwork comprises an attention bias subnetwork and a character joint subnetwork, and wherein the inputting the first character recognition information comprises:

inputting the first character recognition information, the non-streaming audio feature corresponding to the one or more audio frames, and the context information features into the attention bias subnetwork in the attention bias character joint subnetwork;

outputting a character association feature indicating a first association between the first character recognition information and the context information features;

outputting a non-streaming audio association feature indicating a second association between the non-streaming audio feature and the context information features; and inputting the character association feature and the non-streaming audio association feature into the character joint subnetwork, and outputting the text recognition result via the character joint subnetwork.

7. The audio processing method according to claim 6, wherein the attention bias subnetwork comprises a first attention bias subnetwork and a second attention bias subnetwork, and wherein the inputting the first character recognition information comprises:

inputting the first character recognition information and the context information features into the first attention bias subnetwork, and outputting the character association feature via the first attention bias subnetwork; and inputting the non-streaming audio feature and the context information features into the second attention bias subnetwork, and outputting the non-streaming audio association feature via the second attention bias subnetwork, and wherein a first parameter of the first attention bias subnetwork is different from a second parameter of the second attention bias subnetwork.

8. The audio processing method according to claim 5, wherein for an $i^{th}$ audio frame of the one or more audio frames, the inputting the audio signal into the character prediction subnetwork comprises:

acquiring the $i^{th}$ audio frame and an $(i-1)^{th}$ piece of character recognition information corresponding to an $(i-1)^{th}$ audio frame, wherein the $(i-1)^{th}$ piece of character recognition information is generated by the character prediction subnetwork based on the $(i-1)^{th}$ audio frame; and inputting the $i^{th}$ audio frame and the $(i-1)^{th}$ piece of character recognition information into the character prediction subnetwork, and outputting second character recognition information corresponding to the $i^{th}$ audio frame via the character prediction subnetwork, wherein i is an integer greater than 1.

9. The audio processing method according to claim 5, wherein for a first audio frame of the one or more audio frames, the inputting the audio signal into the character prediction subnetwork comprises:

acquiring the first audio frame and preset character recognition information; and inputting the first audio frame and the preset character recognition information into the character prediction subnetwork, and outputting second character recognition information corresponding to the first audio frame via the character prediction subnetwork.

10. The audio processing method according to claim 1, wherein the extracting the one or more second entities comprises:

extracting one or more third entities from the entity set based on the one or more phoneme features, wherein one or more phoneme labels of the one or more third entities correspond to the one or more phoneme features; and extracting the one or more second entities from the one or more third entities based on a first sequence in which the one or more phoneme features appear in the audio signal, wherein a second sequence of the one or more phoneme labels corresponds to the first sequence, and wherein a fourth number of the one or more third entities is less than or equal to the first number and greater than or equal to the second number.

11. An audio processing apparatus, comprising:

at least one memory configured to store computer program code; and at least one processor configured to read the program code and operate as instructed by the program code, the program code comprising:

audio signal acquiring code configured to cause at least one of the at least one processor to acquire an audio signal comprising one or more audio frames;

streaming acoustic network processing code configured to cause at least one of the at least one processor to input the one or more audio frames into a streaming acoustic network to obtain one or more phoneme features representing phoneme information of the audio signal and one or more streaming audio features;

entity set acquiring code configured to cause at least one of the at least one processor to acquire an entity set comprising one or more first entities, wherein the one or more first entities correspond to one or more pieces of phoneme information;

entity extraction code configured to cause at least one of the at least one processor to extract one or more second entities from the entity set based on the one or more phoneme features, wherein the one or more second entities correspond to the one or more phoneme features, and wherein a second number of the one or more second entities is greater than or equal to a third number of the one or more audio frames and less than or equal to a first number of the one or more first entities;

non-streaming acoustic network processing code configured to cause at least one of the at least one processor to obtain a text recognition result based on inputting the audio signal, the one or more streaming audio features, and the one or more second entities into a non-streaming acoustic network; and first outputting code configured to cause at least one of the at least one processor to output the text recognition result.

12. The audio processing apparatus according to claim 11, wherein the streaming acoustic network comprises a causal encoding subnetwork, a phoneme prediction subnetwork, and a phoneme joint subnetwork, and wherein the streaming acoustic network processing code comprises:

performing code configured to cause at least one of the at least one processor to perform feature extraction on the one or more audio frames to obtain one or more audio frame features;

first inputting code configured to cause at least one of the at least one processor to input the one or more audio frame features into the causal encoding subnetwork in the streaming acoustic network, and output streaming audio features corresponding to the one or more audio frame features via the causal encoding subnetwork;

second inputting code configured to cause at least one of the at least one processor to input the one or more audio frames into the phoneme prediction subnetwork, and output first phoneme recognition information corresponding to the one or more audio frames via the phoneme prediction subnetwork; and third inputting code configured to cause at least one of the at least one processor to input the streaming audio features and the first phoneme recognition information into the phoneme joint subnetwork, and output the one or more phoneme features via the phoneme joint subnetwork.

13. The audio processing apparatus according to claim 12, wherein, for an $i^{th}$ audio frame of the one or more audio frames, the second inputting code is configured to cause at least one of the at least one processor to:

acquire the $i^{th}$ audio frame and an $(i-1)^{th}$ piece of phoneme recognition information corresponding to an $(i-1)^{th}$ audio frame, wherein the $(i-1)^{th}$ piece of phoneme recognition information is generated by the phoneme prediction subnetwork based on the $(i-1)^{th}$ audio frame; and input the $i^{th}$ audio frame and the $(i-1)^{th}$ piece of phoneme recognition information into the phoneme prediction subnetwork, and output second phoneme recognition information corresponding to the $i^{th}$ audio frame via the phoneme prediction subnetwork, and wherein i is an integer greater than 1.

14. The audio processing apparatus according to claim 12, wherein for a first audio frame of the one or more audio frames, the second inputting code is configured to cause at least one of the at least one processor to:

acquire the first audio frame and preset phoneme recognition information; and input the first audio frame and the preset phoneme recognition information into the phoneme prediction subnetwork, and output second phoneme recognition information corresponding to the first audio frame via the phoneme prediction subnetwork.

15. The audio processing apparatus according to claim 11, wherein the non-streaming acoustic network comprises a character prediction subnetwork, a non-causal encoding subnetwork, a context information extraction subnetwork, and an attention bias character joint subnetwork, and wherein the non-streaming acoustic network processing code comprises:

first inputting code configured to cause at least one of the at least one processor to input the audio signal into the character prediction subnetwork, and output first character recognition information corresponding to the audio signal via the character prediction subnetwork;

second inputting code configured to cause at least one of the at least one processor to input the one or more streaming audio features into the non-causal encoding subnetwork, and output a non-streaming audio feature corresponding to the one or more audio frames via the non-causal encoding subnetwork;

third inputting code configured to cause at least one of the at least one processor to input the one or more second entities as into the context information extraction subnetwork, and output context information features corresponding to the one or more second entities via the context information extraction subnetwork; and fourth inputting code configured to cause at least one of the at least one processor to input the first character recognition information, the non-streaming audio feature, and the context information features into the attention bias character joint subnetwork, and output the text recognition result via the attention bias character joint subnetwork.

16. The audio processing apparatus according to claim 15, wherein the attention bias character joint subnetwork comprises an attention bias subnetwork and a character joint subnetwork, and wherein the fourth inputting code comprises:

fifth inputting code configured to cause at least one of the at least one processor to input the first character recognition information, the non-streaming audio feature corresponding to the one or more audio frames, and the context information features into the attention bias subnetwork in the attention bias character joint subnetwork;

second outputting code configured to cause at least one of the at least one processor to output a character association feature indicating a first association between the first character recognition information and the context information features;

third outputting code configured to cause at least one of the at least one processor to output a non-streaming audio association feature indicating a second association between the non-streaming audio feature and the context information features; and sixth inputting code configured to cause at least one of the at least one processor to input the character association feature and the non-streaming audio association feature into the character joint subnetwork, and output the text recognition result via the character joint subnetwork.

17. The audio processing apparatus according to claim 16, wherein the attention bias subnetwork comprises a first attention bias subnetwork and a second attention bias subnetwork, and wherein the fourth inputting code is configured to cause at least one of the at least one processor to:

input the first character recognition information and the context information features into the first attention bias subnetwork, and output the character association feature via the first attention bias subnetwork; and input the non-streaming audio feature and the context information features into the second attention bias subnetwork, and output the non-streaming audio association feature via the second attention bias subnetwork, and wherein a first parameter of the first attention bias subnetwork is different from a second parameter of the second attention bias subnetwork.

18. The audio processing apparatus according to claim 15, wherein, for an $i^{th}$ audio frame of the one or more audio frames, the first inputting code is configured to cause at least one of the at least one processor to:

acquire the $i^{th}$ audio frame and an $(i-1)^{th}$ piece of character recognition information corresponding to an $(i-1)^{th}$ audio frame, wherein the $(i-1)^{th}$ piece of character recognition information is generated by the character prediction subnetwork based on the $(i-1)^{th}$ audio frame; and input the $i^{th}$ audio frame and the $(i-1)^{th}$ piece of character recognition information into the character prediction subnetwork, and output second character recognition information corresponding to the $i^{th}$ audio frame via the character prediction subnetwork, and wherein i is an integer greater than 1.

19. The audio processing apparatus according to claim 15, wherein for a first audio frame of the one or more audio frames, the first inputting code is configured to cause at least one of the at least one processor to:

acquire the first audio frame and preset character recognition information; and input the first audio frame and the preset character recognition information into the character prediction subnetwork, and output second character recognition information corresponding to the first audio frame via the character prediction subnetwork.

20. A non-transitory computer-readable storage medium, storing computer code which, when executed by at least one processor, causes the at least one processor to at least:

acquire an audio signal comprising one or more audio frames;

input the one or more audio frames into a streaming acoustic network to obtain one or more phoneme features representing phoneme information of the audio signal and one or more streaming audio features;

acquire an entity set comprising one or more first entities, wherein the one or more first entities correspond to one or more pieces of phoneme information;

extract one or more second entities from the entity set based on the one or more phoneme features, wherein the one or more second entities correspond to the one or more phoneme features, and wherein a second number of the one or more second entities is greater than or equal to a third number of the one or more audio frames and less than or equal to a first number of the one or more first entities;

obtain a text recognition result based on inputting the audio signal, the one or more streaming audio features, and the one or more second entities into a non-streaming acoustic network; and output the text recognition result.

* * * * *